United States Patent
Greene et al.

(10) Patent No.: US 10,128,885 B2
(45) Date of Patent: Nov. 13, 2018

(54) METHOD AND APPARATUS FOR DYNAMIC TUNING

(71) Applicant: BLACKBERRY LIMITED, Waterloo (CA)

(72) Inventors: Matthew Russell Greene, Crystal Lake, IL (US); David Michael Schlueter, Lake Villa, IL (US)

(73) Assignee: BLACKBERRY LIMITED, Waterloo, Ontario (CA)

( * ) Notice: Subject to any disclaimer, the term of this patent is extended or adjusted under 35 U.S.C. 154(b) by 30 days.

(21) Appl. No.: 15/218,752

(22) Filed: Jul. 25, 2016

(65) Prior Publication Data

US 2018/0026667 A1    Jan. 25, 2018

(51) Int. Cl.
*H04B 1/18* (2006.01)
*H04L 5/14* (2006.01)
*H04B 7/06* (2006.01)
*H04W 24/02* (2009.01)
*H04B 17/309* (2015.01)
*H04B 1/04* (2006.01)

(52) U.S. Cl.
CPC ............. *H04B 1/18* (2013.01); *H04B 1/0458* (2013.01); *H04B 7/0615* (2013.01); *H04B 17/309* (2015.01); *H04L 5/14* (2013.01); *H04W 24/02* (2013.01)

(58) Field of Classification Search
None
See application file for complete search history.

(56) References Cited

U.S. PATENT DOCUMENTS

| 9,203,596 B2 * | 12/2015 | Granger-Jones | ......... H04L 5/08 |
| 9,819,324 B2 * | 11/2017 | Desclos | ............... H03H 7/0161 |
| 2009/0121963 A1 | 5/2009 | Greene | |

(Continued)

FOREIGN PATENT DOCUMENTS

| CA | 2973926 | 1/2018 |
| EP | 2688141 A1 | 1/2014 |

(Continued)

OTHER PUBLICATIONS

Extended European Search Report for EP 17183166.2 dated Dec. 12, 2017.

(Continued)

*Primary Examiner* — Brian Roberts
(74) *Attorney, Agent, or Firm* — Guntin & Gust, PLC; David Terrell

(57) ABSTRACT

A system that incorporates teachings of the subject disclosure may include, for example, adjusting a matching network utilizing a first tuning state resulting in a first tuning where the first tuning state is selected from among a first group of predetermined tuning states that increase performance in duplex operation, and responsive to a comparison of a first performance metric with a first reference metric, determining a weighted first tuning state and adjusting the matching network utilizing the weighted first tuning state resulting in a second tuning, where the weighted first tuning state is determined based on a weighting factor, the first tuning state, and a second tuning state selected from a second group of predetermined tuning states. Other embodiments are disclosed.

20 Claims, 30 Drawing Sheets

(56) References Cited

U.S. PATENT DOCUMENTS

| | | |
|---|---|---|
| 2011/0039504 A1 | 2/2011 | Nguyen et al. |
| 2011/0086630 A1 | 4/2011 | Manssen et al. |
| 2011/0250852 A1 | 10/2011 | Greene |
| 2012/0295555 A1 | 11/2012 | Greene et al. |
| 2013/0083703 A1* | 4/2013 | Granger-Jones ....... H04B 1/525 370/277 |
| 2014/0024321 A1 | 1/2014 | Zhu et al. |
| 2015/0133067 A1* | 5/2015 | Chang ..................... H04B 1/48 455/78 |
| 2015/0142139 A1 | 5/2015 | Manssen et al. |
| 2015/0172938 A1* | 6/2015 | Lehtinen .................. H04B 1/54 455/77 |
| 2015/0303892 A1* | 10/2015 | Desclos ............... H03H 7/1758 333/132 |
| 2015/0305035 A1 | 10/2015 | Hu et al. |
| 2018/0026664 A1 | 1/2018 | Greene et al. |
| 2018/0027560 A1 | 1/2018 | Greene et al. |

FOREIGN PATENT DOCUMENTS

| | | |
|---|---|---|
| EP | 3276839 | 1/2018 |
| EP | 3276840 | 1/2018 |
| EP | 3276841 | 1/2018 |

OTHER PUBLICATIONS

Extended European Search Report for EP17183167.0 dated Dec. 12, 2017.
Extended European Search Report for EP17183168 dated Dec. 12, 2017.
Office Action issued U.S. Appl. No. 15/218,845 dated May 31, 2018.

* cited by examiner

LOOK-UP TABLE

| |
|---|
| Band 1; Use Case 1; Desired tuning state |
| Band 1; Use Case 2; Desired tuning state |
| ⋮ |
| Band 1; Use Case n; Desired tuning state |
| Band 2; Use Case 1; Desired tuning state |
| Band 2; Use Case 2; Desired tuning state |
| ⋮ |
| Band 2; Use Case n; Desired tuning state |
| ⋮ |
| Band N; Use Case 1; Desired tuning state |
| Band N; Use Case 2; Desired tuning state |
| ⋮ |
| Band N; Use Case n; Desired tuning state |

METHOD AND APPARATUS FOR DYNAMIC TUNING

FIELD OF THE DISCLOSURE

The subject disclosure relates to a method and apparatus for dynamic tuning.

BACKGROUND

Cellular communication devices such as cellular telephones, tablets, and laptops can support multi-cellular access technologies, peer-to-peer access technologies, personal area network access technologies, and location receiver access technologies, which can operate concurrently. Cellular communication devices have also integrated a variety of consumer features such as MP3 players, color displays, gaming applications, cameras, and other features.

Cellular communication devices can be required to communicate at a variety of frequencies, and in some instances are subjected to a variety of physical and functional use conditions. Some communications utilize carrier aggregation which allows expansion of effective bandwidth delivered to a user terminal through concurrent utilization of radio resources across multiple carriers. Multiple component carriers are aggregated to form a larger overall transmission bandwidth.

BRIEF DESCRIPTION OF THE DRAWINGS

Reference will now be made to the accompanying drawings, which are not necessarily drawn to scale, and wherein:

FIG. 7 depicts an illustrative embodiment of a look-up table utilized by the communication device of FIG. 1 for controlling tunable reactive elements utilized by the communication device;

DETAILED DESCRIPTION

Figure 1:
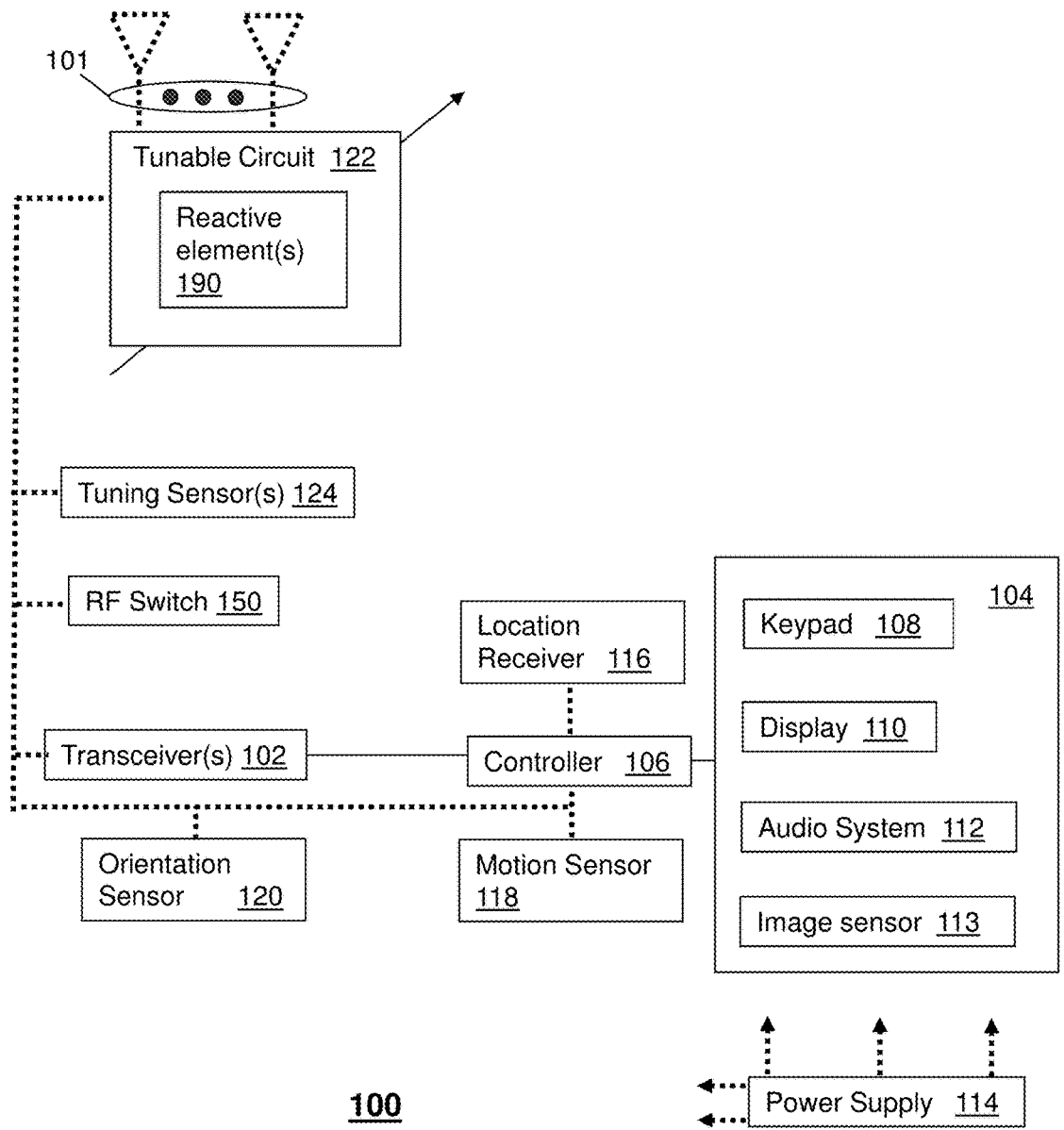
FIG. 1 depicts an illustrative embodiment of a communication device that implements dynamic tuning.

The subject disclosure describes, among other things, illustrative embodiments that provide for antenna tuning that addresses duplex operation and/or carrier aggregation.

Wireless communication devices can implement operations, such as Frequency Division Duplex (FDD), which typically requires Transmit (Tx) and Receive (Rx) to operate simultaneously. For a tunable antenna match, this can mean selecting a single tuning state that works well for both. This is referred to as duplex tuning and can result in a compromise in matching performance compared to a tuning state that is optimized for Tx only or that is optimized for Rx only. As an example, this compromise can typically be around 0.5 to 1.0 dB. The link is often asymmetric in many regards. It may be desirable to have the match favor Tx in some cases, or favor Rx in other cases.

In one or more embodiments, the communication device may or may not include a compromise between Tx and Rx matching that is set at the design phase by weighting Tx and Rx matching performance either equally or unequally. One or more of the exemplary embodiments can further implement a tuning algorithm(s) that adjusts the weight between Tx and Rx matching, dynamically, as a function of the real-time conditions of the radio, the link, and/or the current application or usage of the wireless communication device (e.g., a handset). Similar compromises in antenna matching can exist for carrier aggregation, and may be to an even greater extent since there are more carriers that need to be matched simultaneously. For carrier aggregation, this compromise can typically be up to 1.0 to 3.0 dB. One or more of the exemplary embodiments can implement dynamic weighting of tuning solutions during carrier aggregation operation. The use of dynamic weighting between matching at different frequencies can be particularly beneficial for wireless communication device that support carrier aggregation.

In one or more embodiments, a closed loop tuning system is provided that can converge to more than one solution. For example, the system can converge to an optimal Tx solution, an optimal Rx solution, an optimal Duplex solution, and/or a compromise between the aforementioned solutions. In one or more embodiments, the system can dynamically change the type of solution being targeted based on real time changes detected or otherwise determined in the field.

In one or more embodiments, the criteria to determine how to optimize the match can be based on usage conditions of the wireless communication device and/or based on measurements or status of the radio. For example, handset usage conditions can include downloading a large file, attachments, an application, or streaming video. During such usage conditions, it may be preferable to bias a tuning match towards Rx (DownLink (DL)). Conversely, if the usage condition is uploading a large file, attachments, posting a video, it may be preferable to bias the tuning match towards Tx (UpLink (UL)). Execution of certain applications may be known to be downlink centric or uplink centric and the tuning match can be biased accordingly. There can also be certain radio conditions or measurements that would indicate a preference for a Tx biased match or an Rx biased match, such as Resource Block (RB) allocation (UL and DL), modulation type (UL and DL), data throughput (UL and DL), Tx power level, Received Signal Strength Indicator (RSSI), Received Signal Code Power (RSCP), Discontinuous Transmission (DTX), battery level, and/or derived antenna use case.

Other embodiments are described by the subject disclosure. The present disclosure is related to co-pending application Ser. No. 15/218,798, filed Jul. 25, 2016 entitled "Method and Apparatus For Dynamic Tuning" and co-pending application Ser. No. 15/218,845, filed Jul. 25, 2016 entitled "Method and Apparatus For Dynamic Tuning", the disclosures of which are hereby incorporated by reference in their entirety.

One embodiment of the subject disclosure is a communication device having a matching network including a tunable reactive element, a processing system including a processor where the processing system is coupled with the matching network, and a memory that stores executable instructions that, when executed by the processing system, facilitate performance of operations. The operations include, during FDD communication, selecting a first tuning state from a group of tuning states stored in the memory, where the group of tuning states is predetermined tuning states based on increasing performance in duplex operation. The operations include adjusting the matching network utilizing the first tuning state resulting in a first tuning. The operations include responsive to the first tuning, determining a first performance metric according to a first measurement associated with the FDD communication. The operations include comparing the first performance metric to a first reference metric that is stored in the memory resulting in a first comparison. The operations include, responsive to a first determination that the first performance metric satisfies a first threshold according to the first comparison, determining a weighted first tuning state and adjusting the matching network utilizing the weighted first tuning state resulting in a second tuning. The weighted first tuning state is determined based on a weighting factor, the first tuning state, and a second tuning state selected from another group of tuning states stored in the memory.

One embodiment of the subject disclosure is a method that includes adjusting, by a processor of a communication device, a matching network utilizing a first tuning state resulting in a first tuning, where the first tuning state is selected from among a first group of predetermined tuning states that increase performance in duplex operation. The method includes, responsive to a comparison of a first performance metric with a first reference metric, determining, by the processor, a weighted first tuning state and adjusting the matching network utilizing the weighted first tuning state resulting in a second tuning, wherein the weighted first tuning state is determined based on a weighting factor, the first tuning state, and a second tuning state selected from a second group of predetermined tuning states.

One embodiment of the subject disclosure is a machine-readable storage medium, including executable instructions that, when executed by a processor of a communication device, facilitate performance of operations. The operations include adjusting a matching network of the communication device utilizing a first tuning state resulting in a first tuning, where the first tuning state is selected from among a first group of predetermined tuning states that increase performance in duplex operation. The operations include, responsive to a comparison of a first performance metric with a first reference metric, determining a weighted first tuning state and adjusting the matching network utilizing the weighted first tuning state resulting in a second tuning, wherein the weighted first tuning state is determined based on a weighting factor, the first tuning state, and a second tuning state selected from a second group of predetermined tuning states.

One embodiment of the subject disclosure is a communication device including a matching network having a tunable reactive element; a processing system including a processor, the processing system being coupled with the matching network; and a memory that stores executable instructions that, when executed by the processing system, facilitate performance of operations. The operations include, during FDD communication, determining a first tuning state for increased performance in transmit operation and a second tuning state for increased performance in receive operation. The operations include detecting a change in operational function of the communication device and adjusting weighting for transmit matching and receive matching resulting in adjusted weighting based on the change in the operational function. The operations include determining a tuning configuration for the matching network according to the adjusted weighting and at least one of the first tuning state or the second tuning state.

One embodiment of the subject disclosure is a method that includes, during FDD communication, determining, by a processor of a communication device, first and second tuning states based on selections from first and second groups of tuning states, respectively, that are stored in a memory of the communication device. The method includes detecting, by the processor, an operational function of the communication device. The method includes adjusting, by the processor, weighting between the first and second tuning states according to the operational function resulting in an adjusted weighting. The method includes determining, by the processor, a tuning configuration for a matching network of the communication device according to interpolation that utilizes the first and second tuning states in conjunction with the adjusted weighting.

One embodiment of the subject disclosure is a machine-readable storage medium, including executable instructions that, when executed by a processor of a communication device, facilitate performance of operations. The operations include determining first and second tuning states based on selections from first and second groups of tuning states, respectively, that are stored in a memory of the communication device, where the first and second groups of tuning states are predetermined tuning states associated with transmit and receive operations, respectively. The operations include detecting an operational function of the communication device and adjusting weighting between the first and second tuning states according to the operational function resulting in an adjusted weighting. The operations include determining a tuning configuration for a matching network of the communication device according to interpolation that utilizes the first and second tuning states in conjunction with the adjusted weighting. The operations include adjusting a tunable reactive element of the matching network according to the tuning configuration.

Radio band information is generally available or otherwise retrievable in communication devices, which provides the broadest definition of where in a frequency spectrum a communication device such as a handset is operating (e.g., transmitting). In communication systems (e.g., cellular systems), frequencies are commonly allocated for usage in a block or range of frequencies. This block or range of frequencies is commonly known as a radio band. Multiple radio bands can be present in any given cellular system, and in any geographic location there can be multiple cellular systems present.

A radio channel identifies a discrete set of frequencies in a cellular system that contains the downlink (from base station to the handset) and uplink (from handset to base station) radio signals. Downlink is also referred to as Rx and uplink is also referred to as Tx. In most systems, such as WCDMA (Wideband Code Division Multiple Access), uplink and downlink use separate frequencies that are separated by the duplex distance, which is the number of Hz separating the uplink and downlink paths. For other systems, such as TD-LTE (Time Division Long Term Evolution), the uplink and downlink use the same frequency.

One or more of the exemplary embodiments can utilize radio band information, including only radio band information in some embodiments, for antenna tuning. The exemplary embodiments can apply to various types of communication devices, including wireless handsets operating utilizing one or more of various communication protocols.

RF tuning based on limited information, such as only the radio band, can create a number of problems. In an ideal cellular system that employs RF tuning, the tuner would be set to match every frequency on which the radio receives or transmits, with the understanding that typically a single antenna is used for both Rx and Tx which requires the RF tuner to change tuning state as the RF signal on the antenna changes frequency. For half-duplex systems, such as GSM that would be for every Rx and Tx, including neighbor cells. In full-duplex systems, such as WCDMA where both Rx and Tx are present concurrently, the RF tuner has to change when the frequency changes for handoffs and neighbor cell monitoring, and additionally the tuning state has to be a duplex setting for Rx and Tx on a frequency between the Rx and Tx frequencies.

In order to perform RF tuning in such an ideal system, the entity controlling the tuner could require exact knowledge in real time of all relevant information pertaining to operating the tuner, such as the radio timing, radio band, radio channel, RF duplex information, and transmit state. Tuning based on limited information occurs when the entity controlling the tuner does not have all the information required to set the RF tuner to match an exact frequency at a given time. For example, real time channel information could be missing, in which case the tuner control entity could set the RF tuner based on information pertaining to the Radio Band only.

Tx and Rx operations often cannot or are not tuned in real-time. This can result in or necessitate a broader duplex type tuning. Duplex tuning refers to where the tunable element for a particular sub-band or radio channel is tuned to a frequency between uplink and downlink; one tuning state can be used for both Rx and Tx in this case. In some systems that are full-duplex (concurrent uplink and downlink, such as WCDMA), duplex tuning is commonly used. Other systems that are half-duplex (uplink and downlink are not concurrent, such as GSM), the tuner can be tuned for Rx and Tx separately.

Sub-band describes a grouping of frequencies (e.g., radio channels) consisting of one or more radio channels. In tuning applications, sub-dividing a radio band into multiple sub-bands can provide the advantage of being able to apply a particular tuning state to a small or smaller range of radio channels. Sub-bands can be used in conjunction with storage and application of calibration data in cellular handsets, providing a compromise between accuracy and amount of storage needed to hold said calibration data.

An example of a radio band is the GSM 900 band, in which the uplink frequencies can occupy the range 880.0 to 915.0 MHz and the downlink frequencies can occupy the range 925.0 to 960.0 MHz. The duplex spacing can be 45 MHz. The first channel can be channel 975 which has uplink at 880.2 MHz and downlink at 915.2 MHz. The last channel can be channel 124 which has uplink at 914.8 MHz and downlink at 959.8 MHz.

The GSM 900 band can, for example, be subdivided into 3 sub bands as follows: Sub band 1 ranging from channel 975 to channel 1023 (48 channels, 9.6 MHz wide), Sub Band 2 ranging from channel 0 to channel 66 (66 channels, 13.2 MHz wide), and sub band 3 ranging from channel 67 to channel 124 (57 channels, 11.4 MHz wide). This is an example of a radio band and sub-bands, and the present disclosure can include various configurations of radio bands and sub-bands.

Similar principles can be applied to other existing wireless access technologies (e.g., LTE etc.) as well as future generation access technologies.

FIG. 1 depicts an illustrative embodiment of a communication device 100. In one embodiment, communication device 100 can: during FDD communication, select a first tuning state from a group of tuning states stored in the memory, the group of tuning states being predetermined tuning states based on increasing performance in duplex operation; adjust the matching network utilizing the first tuning state resulting in a first tuning; responsive to the first tuning, determine a first performance metric according to a first measurement associated with the FDD communication; compare the first performance metric to a first reference metric that is stored in the memory resulting in a first comparison; and responsive to a first determination that the first performance metric satisfies a first threshold according to the first comparison, determine a weighted first tuning state and adjusting the matching network utilizing the weighted first tuning state resulting in a second tuning, where the weighted first tuning state is determined based on a weighting factor, the first tuning state, and a second tuning state selected from another group of tuning states stored in the memory.

In one embodiment, communication device 100 can: responsive to a second determination that the first performance metric does not satisfy the first threshold according to the first comparison, select a third tuning state from the group of tuning states. In one embodiment, communication device 100 can: responsive to the second tuning, determine a second performance metric according to a second measurement associated with the FDD communication; compare the second performance metric to a second reference metric resulting in a second comparison; responsive to a third determination that the second performance metric does not satisfy a second threshold according to the second comparison, select the third tuning state from the group of tuning states; and responsive to a fourth determination that the second performance metric satisfies the second threshold according to the second comparison, continue the second tuning. In one embodiment, the second tuning state is selected from the other group of tuning states according to the first tuning state, where the other group of tuning states is predetermined tuning states based on increasing performance in at least one of transmit or receive operation. In one embodiment, the first performance metric comprises an input reflection coefficient. In one embodiment, the weighting factor is determined based on an operational function of the communication device. In one embodiment, the operational function includes downloading an amount of data above a download threshold, and where the weighting factor is biased towards a receive operation. In one embodiment, the operational function includes transmitting an amount of data above an upload threshold, and where the weighting factor is biased towards a transmit operation. In one embodiment, communication device 100 can: monitor a transmit power level; and can determine a link margin based on the monitoring, where the operational function comprises a determination that the link margin is equal to or below a link margin threshold, and where the weighting factor is biased towards a transmit operation. In one embodiment, communication device 100 can: monitor a receive metric associated with a received signal during the FDD communication; and can determine a link margin based on the monitoring, where the operational function comprises a determination that the link margin is equal to or below a link margin threshold, and where the weighting factor is biased towards a receive operation. In one embodiment, communication device 100 can: monitor resource block allocation for the FDD communication, and where the operational function is determined based on the monitoring. In one embodiment, communication device 100 can: monitor data throughput for the FDD communication, and where the operational function is determined based on the monitoring. In one embodiment, communication device 100 can: monitor battery level during the FDD communication, and where the operational function is determined based on the monitoring. In one embodiment, the operational function of the communication device includes a particular application being executed at the communication device. In one embodiment, the other group of tuning states includes predetermined tuning states based on increasing performance in transmit operation and in receive operation. In one embodiment, the first tuning state includes a tuning voltage, and where the tunable reactive element comprises a voltage tunable capacitor.

In one embodiment, the communication device 100 can determine a first tuning state for increased performance in transmit operation and a second tuning state for increased performance in receive operation (e.g., during FDD communication); detect a change in operational function of the communication device; adjust weighting for transmit matching and receive matching resulting in adjusted weighting based on the change in the operational function; and determine a tuning configuration for the matching network according to the adjusted weighting and at least one of the first tuning state or the second tuning state. In one embodiment, communication device 100 can adjust the tunable reactive element according to the tuning configuration. In one embodiment, the change in the operational function includes downloading an amount of data above a threshold, and where the adjusted weighting is biased towards the second tuning state for the receive operation. In one embodiment, the change in the operational function includes transmitting an amount of data above a threshold, and where the adjusted weighting is biased towards the first tuning state for the transmit operation. In one embodiment, communication device 100 can monitor a transmit power level; and can determine a link margin based on the monitoring, where the change in the operational function comprises a determination that the link margin is equal to or below a link margin threshold, and where the adjusted weighting is biased towards the first tuning state for the transmit operation.

In one embodiment, communication device 100 can monitor a receive metric associated with a received signal during the FDD communication; and can determine a link margin based on the monitoring, where the change in the operational function comprises a determination that the link margin is equal to or below a link margin threshold, and where the adjusted weighting is biased towards the second tuning state for the receive operation. In one embodiment, communication device 100 can monitor resource block allocation for the FDD communication, and where the detecting the change in the operational function is determined based on the monitoring. In one embodiment, communication device 100 can monitor data throughput for the FDD communication, and where the detecting the change in the operational function is determined based on the monitoring. In one embodiment, communication device 100 can monitor battery level during the FDD communication, and where the detecting the change in the operational function is determined based on the monitoring. In one embodiment, communication device 100 can store a first group of tuning states for the increased performance in the transmit operation in the memory, where the first group of tuning states includes the first tuning state; and can store a second group of tuning states for the increased performance in the receive operation in the memory, where the second group of tuning states includes the second tuning state, where the determining the first and second tuning states is based on selections from the first and second groups of tuning states, respectively, and where the determining the tuning configuration is based on an interpolation between the first and second tuning states that utilizes the adjusted weighting.

In one embodiment, the first and second group of tuning states can be indexed in a table based on band and channel information. In one embodiment, the detecting the change in the operational function of the communication device is based on monitoring applications being executed at the communication device. In one embodiment, the detecting the change in the operational function of the communication device is based on measuring a signal parameter for the FDD communication. In one embodiment, the determining the tuning configuration for the matching network is based in part on a third tuning state for increased performance in duplex operation. In one embodiment, communication device 100 can store a first group of tuning states for the increased performance in the transmit operation in the memory, where the first group of tuning states includes the first tuning state; can store a second group of tuning states for the increased performance in the receive operation in the memory, where the second group of tuning states includes the second tuning state; can store a third group of tuning states for increased performance in duplex operation in the memory; and during the FDD communication, can determine a third tuning state according to a selection from among the third group of tuning states, where the determining the first and second tuning states is based on selections from the first and second groups of tuning states, respectively, and where the determining the tuning configuration is based on an interpolation that utilizes two or more of the first, second and third tuning states in conjunction with the adjusted weighting.

The communication device 100 can include various components that are arranged in various configurations. The communication device 100 can comprise one or more transceivers 102 coupled to an antenna system 101, which can be any number of antennas. As an example, each transceiver can have transmitter and receiver sections herein described as transceiver 102 or transceivers 102. The communication device 100 can have one or more tunable circuits 122 including reactive element(s) 190, one or more tuning sensors 124, a user interface (UI) 104, a power supply 114, a location receiver 116, a motion sensor 118, an orientation sensor 120, and/or a controller 106 for managing operations thereof. The transceiver 102 can support short-range and/or long-range wireless access technologies, including Bluetooth, ZigBee, Wireless Fidelity (WiFi), Digital Enhance Cordless Telecommunications (DECT), or cellular communication technologies, just to mention a few. The communication device 100 can be a multi-mode device capable of providing communication services via various wireless access technologies, including two or more such services simultaneously.

Cellular technologies used by the communication device 100 can include, for example, Global System for Mobile (GSM), Code Division Multiple Access (CDMA), Time Division Multiple Access (TDMA), Universal Mobile Telecommunications (UMTS), World interoperability for Microwave (WiMAX), Software Defined Radio (SDR), Long Term Evolution (LTE), as well as other next generation wireless communication technologies as they arise. The transceiver 102 can also be adapted to support circuit-switched wireline access technologies such as Public Switched Telephone Network (PSTN), packet-switched wireline access technologies such as TCP/IP, Voice over IP-VoIP, etc., or combinations thereof.

In one or more embodiments, dimensions, shapes and/or positions for the group of antennas of antenna system 101 can achieve a desired performance characteristic while fitting different mechanical arrangements. These dimensions, shapes and/or positions can be adjusted to achieve other desired performance characteristic and/or for fitting other mechanical arrangements.

In one embodiment, the communication device 100 can include an RF switch 150 (or other component) for switching the functionality of antennas of the antenna system 101 including switching primary antennas to diversity antennas and vice versa. For example, parameters of the communication device 100 (e.g., reflection measurements for one, some or all of the antennas) can be monitored, detected or otherwise determined in order to identify a change in impedance. The impedance change can result from a change in use case (e.g., switching from left hand to right hand to hold phone). The identification of the impedance change can trigger a change in the antenna system configuration via the RF switch 150 (e.g., controlled by controller 106). The number of times this switch occurs can be based on the detected parameters, such as according to a user that keeps switching hands during a communication session. The switching of antennas can also be limited by a modem of the communication device 100.

The tunable circuit 122 can comprise one or more variable reactive elements such as variable capacitors, variable inductors, or combinations thereof that are tunable with digital and/or analog bias signals. The tunable circuit 122 can represent a tunable matching network coupled to the antenna system 101 to compensate for a change in impedance of the antenna 101, a compensation circuit to compensate for mutual coupling in a multi-antenna system, an amplifier tuning circuit to control operations of an amplifier of the transceiver 102, a filter tuning circuit to alter a pass band of a filter used by the transceiver 102, and so on. In one or more embodiments, the tunable circuit 122 can be connected with one, some or all of the antennas of antenna system 101 to enable impedance tuning.

In one or more embodiments, tuning sensors 124 can be placed at any stage of the transceiver 102 such as, for example, before or after a matching network, and/or at a power amplifier. The tuning sensors 124 can utilize any suitable sensing technology such as directional couplers, voltage dividers, or other sensing technologies to measure signals at any stage of the transceiver 102. The digital samples of the measured signals can be provided to the controller 106 by way of analog-to-digital converters included in the tuning sensors 124. Data provided to the controller 106 by the tuning sensors 124 can be used to measure, for example, scalar and/or complex reflection coefficient, transmit power, transmitter efficiency, receiver sensitivity, power consumption of the communication device 100, frequency band selectivity by adjusting filter passbands, linearity and efficiency of power amplifiers, specific absorption rate (SAR) requirements, and so on. The controller 106 can be configured to execute one or more tuning algorithms to determine desired tuning states of the tunable circuit 122 based on the foregoing measurements. The controller 106 can also switch the primary and diversity antennas via RF switch 150 based on data obtained from the tuning sensors 124, including based on reflection measurements.

The UI 104 can include a depressible or touch-sensitive keypad 108 with a navigation mechanism such as a roller ball, a joystick, a mouse, or a navigation disk for manipulating operations of the communication device 100. The keypad 108 can be an integral part of a housing assembly of the communication device 100 or an independent device operably coupled thereto by a tethered wireline interface (such as a USB cable) or a wireless interface supporting, for example, Bluetooth. The keypad 108 can represent a numeric keypad commonly used by phones, and/or a QWERTY keypad with alphanumeric keys. The UI 104 can further include a display 110 such as monochrome or color LCD (Liquid Crystal Display), OLED (Organic Light Emitting Diode) or other suitable display technology for conveying images to an end user of the communication device 100. In an embodiment where the display 110 is touch-sensitive, a portion or all of the keypad 108 can be presented by way of the display 110 with navigation features.

The display 110 can use touch screen technology to also serve as a user interface for detecting user input. As a touch screen display, the communication device 100 can be adapted to present a user interface with graphical user interface (GUI) elements that can be selected by a user with a touch of a finger. The touch screen display 110 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 110 can be an integral part of the housing assembly of the communication device 100 or an independent device communicatively coupled thereto by a tethered wireline interface (such as a cable) or a wireless interface.

The UI 104 can also include an audio system 112 that utilizes audio technology for conveying low volume audio (such as audio heard in proximity of a human ear) and high volume audio (such as speakerphone for hands free operation). The audio system 112 can further include a microphone for receiving audible signals of an end user. The audio system 112 can also be used for voice recognition applications. The UI 104 can further include an image sensor 113 such as a charged coupled device (CCD) camera for capturing still or moving images.

The power supply 114 can utilize common power management technologies such as replaceable and rechargeable batteries, supply regulation technologies, and/or charging system technologies for supplying energy to the components of the communication device 100 to facilitate long-range or short-range portable applications. Alternatively, or in combination, the charging system can utilize external power sources such as DC power supplied over a physical interface such as a USB port or other suitable tethering technologies. In one or more embodiments, wireless charging can be performed. Various types of charging (e.g., tethered, wireless, etc.) can be detected and utilized to determine a use case of the device 100, such as determining hands-free operation according to wireless charging.

The location receiver 116 can utilize location technology such as a global positioning system (GPS) receiver capable of assisted GPS for identifying a location of the communication device 100 based on signals generated by a constellation of GPS satellites, which can be used for facilitating location services such as navigation. The motion sensor 118 can utilize motion sensing technology such as an accelerometer, a gyroscope, or other suitable motion sensing technology to detect motion of the communication device 100 in three-dimensional space. The orientation sensor 120 can utilize orientation sensing technology such as a magnetometer to detect the orientation of the communication device 100 (north, south, west, and east, as well as combined orientations in degrees, minutes, or other suitable orientation metrics).

The communication device 100 can use the transceiver 102 to also determine a proximity to or distance to cellular, WiFi, Bluetooth, or other wireless access points by sensing techniques such as utilizing a received signal strength indicator (RSSI) and/or signal time of arrival (TOA) or time of flight (TOF) measurements.

The controller 106 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 100.

Other components not shown in FIG. 1 can be used by the subject disclosure. The communication device 100 can include a slot for inserting or removing an identity module such as a Subscriber Identity Module (SIM) card. SIM cards can be used for identifying and registering for subscriber services, executing computer programs, storing subscriber data, and so forth.

Figure 2:
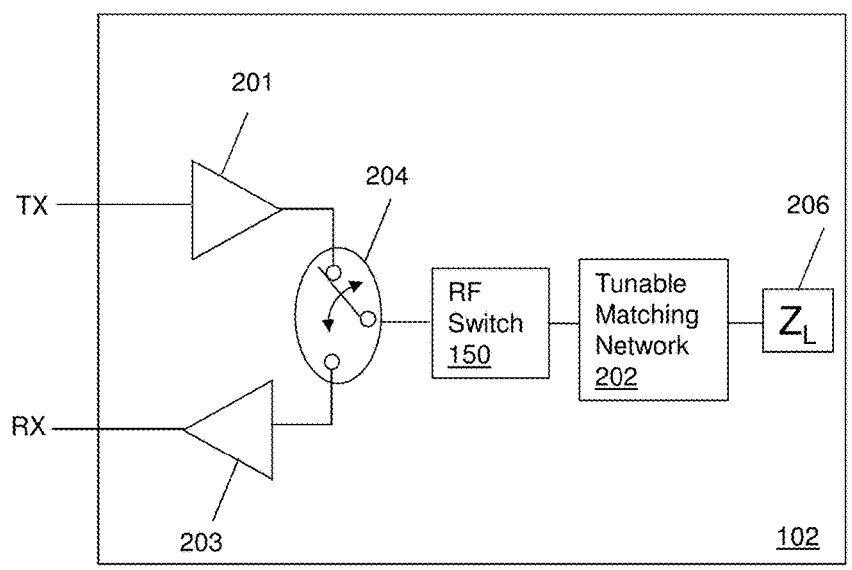
FIG. 2 depicts an illustrative embodiment of a portion of a transceiver of the communication device of FIG. 1.

FIG. 2 depicts an illustrative embodiment of a portion of the wireless transceiver 102 of the communication device 100 of FIG. 1. In GSM applications, the transmit and receive portions of the transceiver 102 can include amplifiers 201, 203 coupled to a tunable matching network 202 that is in turn coupled to an impedance load 206 (which can be one or more antennas including primary and diversity antennas). Antenna switching, via switch 150, can be performed based on operational parameters associated with one, some, or all of the antennas, such as based on reflection measurements.

In one or more embodiments, a full duplex configuration without switch 204 can be utilized such as for an LTE or WCDMA application such as where a duplex filter is utilized for implementing duplex operation. The tunable matching network 202 can include all or a portion of the tuning circuit 122 of FIG. 1, such as variable capacitors to enable high linearity tuning while satisfying performance criteria such as insertion loss thresholds and/or response time speed. The impedance load 206 in the present illustration can be all or a portion of the antenna system (e.g., reconfigurable via RF switch 150) as shown in FIG. 1 (herein antenna 206). In one or more embodiments, the RF switch 150 can be on the Tx/Rx side of the matching network(s) 202. In another embodiment, a separate matching network 202 can be used for each antenna. A transmit signal in the form of a radio frequency (RF) signal (TX) can be directed to the amplifier 201 which amplifies the signal and directs the amplified signal to the antenna 206 by way of the tunable matching network 202 when switch 204 is enabled for a transmission session. The receive portion of the transceiver 102 can utilize a pre-amplifier 203 which amplifies signals received from the antenna 206 by way of the tunable matching network 202 when switch 204 is enabled for a receive session. Other configurations of FIG. 2 are possible for other types of cellular access technologies such as CDMA, UMTS, LTE, and so forth. The exemplary embodiments are applicable to all types of radio technologies including WiFi, GPS and so forth, and are not intended to be limited to cellular access technologies. These undisclosed configurations are applicable to the subject disclosure.

Figure 3:
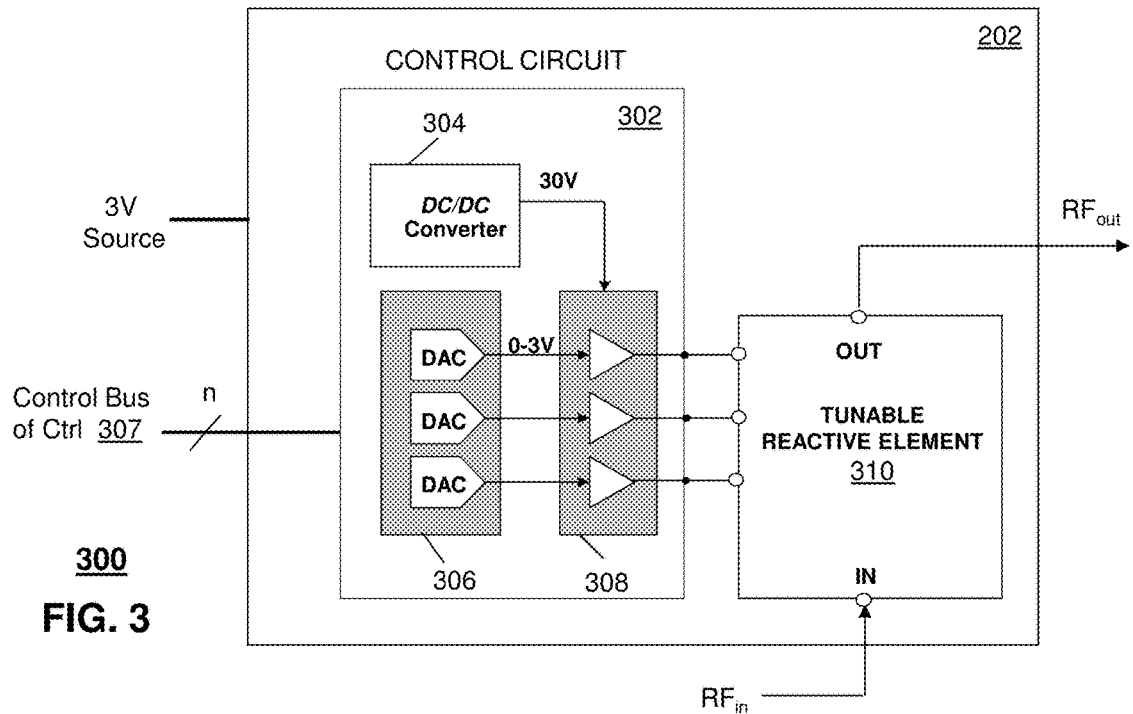
FIGS. 3-6 depict illustrative embodiments of a tunable matching network of the transceiver of FIG. 2.
Figure 4:
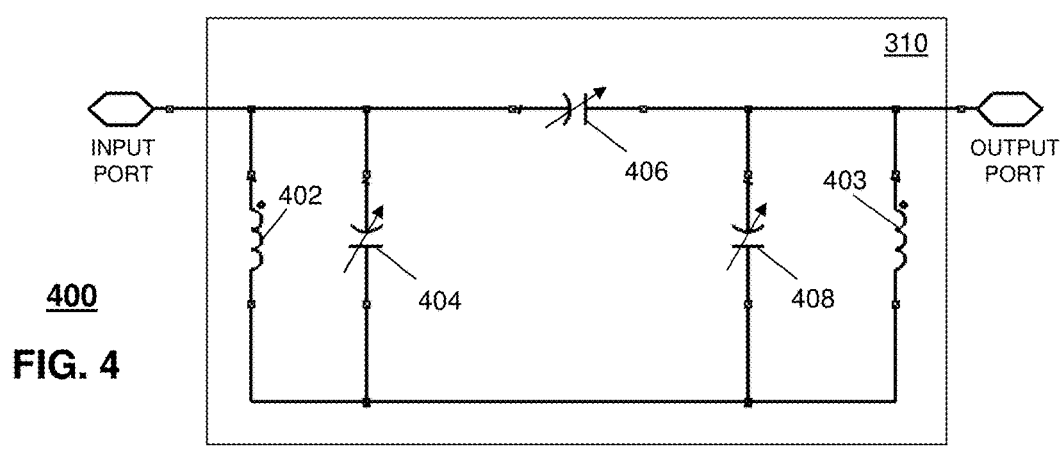

FIGS. 3-4 depict illustrative embodiments of the tunable matching network 202 of the transceiver 102 of FIG. 2. Matching network 202 can be tuned according to a tuning configuration that is derived from a dynamic weighting technique.

As an example, the matching network 202 can be adjusted utilizing a first tuning state resulting in a first tuning, where the first tuning state is selected from among a first group of predetermined tuning states that increase performance in duplex operation, Responsive to a comparison of a first performance metric with a first reference metric, a weighted first tuning state can be determined and the matching network 202 can be adjusted utilizing the weighted first tuning state resulting in a second tuning, where the weighted first tuning state is determined based on a weighting factor, the first tuning state, and a second tuning state selected from a second group of predetermined tuning states. As another example, first and second tuning states can be determined based on selections from first and second groups of tuning states, respectively, that are stored in a memory of the communication device 100, where the first and second groups of tuning states are predetermined tuning states associated with transmit and receive operations, respectively. An operational function of the communication device 100 can then be determined and an adjustment can be made to weighting between the first and second tuning states according to the operational function resulting in an adjusted weighting. A tuning configuration can be determined for the matching network 202 according to interpolation that utilizes the first and second tuning states in conjunction with the adjusted weighting. The matching network 202 can then be adjusted according to the tuning configuration.

In one embodiment, the tunable matching network 202 can comprise a control circuit 302 and a tunable reactive element 310. The control circuit 302 can comprise a DC-to-DC converter 304, one or more digital to analog converters (DACs) 306 and one or more corresponding buffers 308 to amplify the voltage generated by each DAC. The amplified signal can be fed to one or more tunable reactive components 404, 406 and 408 such as shown in FIG. 4, which depicts a possible circuit configuration for the tunable reactive element 310. In this illustration, the tunable reactive element 310 includes three tunable capacitors 404-408 and two inductors 402-403 with a fixed inductance. Circuit configurations such as "Tee", "Pi", and "L" configurations for a matching circuit are also suitable configurations that can be used in the subject disclosure. In one or more embodiments, switches can be utilized for changing the circuit configurations, such as enabling switching between "Tee", "Pi", and "L" configurations.

The tunable capacitors 404-408 can each utilize technology that enables tunability of the reactance of the component. One embodiment of the tunable capacitors 404-408 can utilize voltage or current tunable dielectric materials. The tunable dielectric materials can utilize, among other things, a composition of barium strontium titanate (BST). In another embodiment, the tunable reactive element 310 can utilize semiconductor varactors. The tunable capacitors 404-408 can also be implemented utilizing arrays of semiconductor switches or micro-electromechanical systems (MEMS) switches connected with reactive elements such as a capacitor. Other present or next generation methods or material compositions that result in a voltage or current tunable reactive element are applicable to the subject disclosure for use by the tunable reactive element 310 of FIG. 3.

The DC-to-DC converter 304 can receive a DC signal such as 3 volts from the power supply 114 of the communication device 100 in FIG. 1. The DC-to-DC converter 304 can use technology to amplify a DC signal to a higher range (e.g., 30 volts) such as shown. The controller 106 can supply digital signals to each of the DACs 306 by way of a control bus 307 of "n" or more wires or traces to individually control the capacitance of tunable capacitors 404-408, thereby varying the collective reactive impedance of the tunable matching network 202. The control bus 307 can be implemented with a two-wire serial bus technology such as a Serial Peripheral Interface (SPI) bus (referred to herein as SPI bus 307) or MIPI RF Front End (RFFE) component. With an SPI bus 307, the controller 106 can transmit serialized digital signals to configure each DAC in FIG. 3. The control circuit 302 of FIG. 3 can utilize digital state machine logic to implement the SPI bus 307, which can direct digital signals supplied by the controller 106 to the DACs to control the analog output of each DAC, which is then amplified by buffers 308. In one embodiment, the control circuit 302 can be a stand-alone component coupled to the tunable reactive element 310. In another embodiment, the control circuit 302 can be integrated in whole or in part with another device such as the controller 106.

Although the tunable reactive element 310 is shown in a unidirectional fashion with an RF input and RF output, the RF signal direction is illustrative and can be interchanged. Additionally, either port of the tunable reactive element 310 can be connected to a feed point of the antenna 206, a structural element of the antenna 206 in an on-antenna configuration, or between antennas for compensating mutual coupling when diversity antennas are used, or when antennas of differing wireless access technologies are physically in close proximity to each other and thereby are susceptible to mutual coupling. The tunable reactive element 310 can also be connected to other circuit components of a transmitter or a receiver section such as filters, amplifiers, and so on, to control operations thereof.

Figure 6:
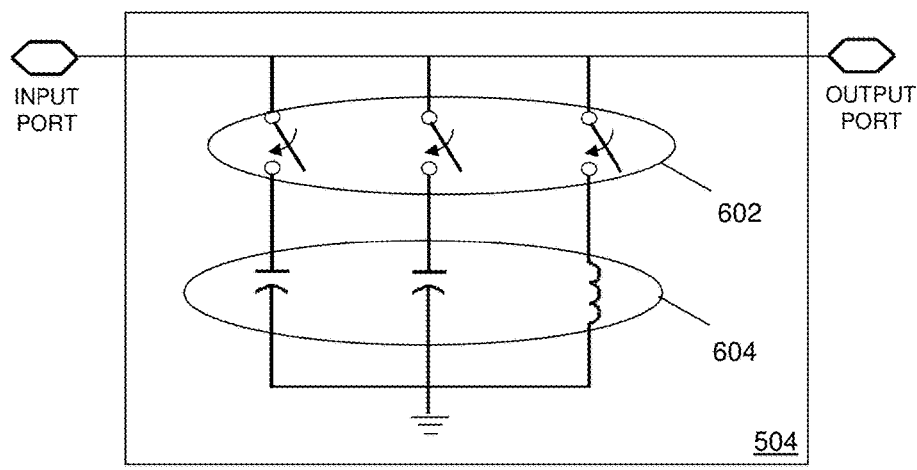

In another embodiment, the tunable matching network 202 of FIG. 2 can comprise a control circuit 502 in the form of a decoder and a tunable reactive element 504 comprising switchable reactive elements such as shown in FIG. 6. In this embodiment, the controller 106 can supply the control circuit 402 signals via the SPI bus 307, which can be decoded with Boolean or state machine logic to individually enable or disable the switching elements 602. The switching elements 602 can be implemented with semiconductor switches, MEMS, or other suitable switching technology. By independently enabling and disabling the reactive elements 604 (capacitor or inductor) of FIG. 6 with the switching elements 602, the collective reactive impedance of the tunable reactive element 504 can be varied by the controller 106.

Figure 5:
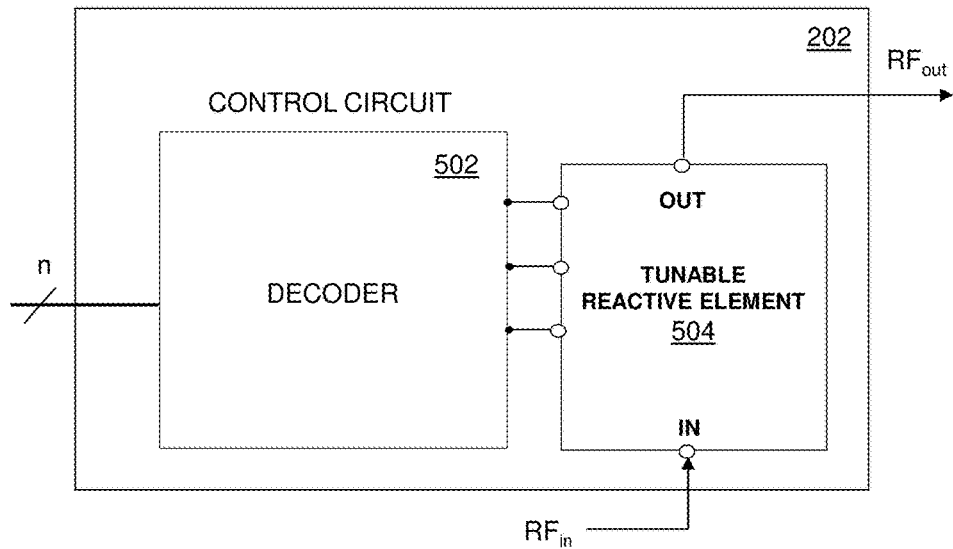

The tunable reactive elements 310 and 504 of FIGS. 3 and 5, respectively, can be used with various circuit components of the transceiver 102 to enable the controller 106 to manage performance factors or metrics such as, for example, but not limited to, scalar and/or complex reflection coefficient, transmit power, transmitter efficiency, receiver sensitivity, power consumption of the communication device 100, frequency band selectivity by adjusting filter passbands, linearity and efficiency of power amplifiers, SAR requirements, among other operational parameters.

FIG. 7 depicts an illustration of a look-up table stored in memory, which can be indexed by the controller 106 of the communication device 100 of FIG. 1 according to various criteria for use in dynamic weighted tuning as described herein. For example, the criteria can include one or more of channel/band, physical and/or functional use cases of the communication device 100, and so forth. A physical use case can represent a physical state of the communication device 100, while a functional use case can represent an operational state of the communication device 100. The table of FIG. 7 can include various information such as tuning states for increased or optimal performance in Tx, Rx and/or duplex operation (e.g., for a given FDD communication); carrier aggregation and/or aggregated Rx tuning states for increased or optimal performance; expected performance metric(s) (e.g., input reflection coefficient) for Tx, Rx and/or duplex operation (e.g., for a given FDD communication), and so forth.

Figure 8:
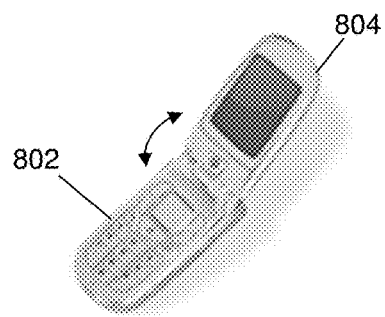
FIGS. 8-11 depict illustrative physical and operational use cases of a communication device.

In one embodiment, for a flip phone 800 of FIG. 8, an open flip can represent one physical use case, while a closed flip can represent another physical use case. In a closed flip state (i.e., bottom and top flips 802-804 are aligned), a user is likely to have his/her hands surrounding the top flip 802 and the bottom flip 804 while holding the phone 800, which can result in one range of load impedances experienced by an internal or retrievable antenna (not shown) of the phone 800. The range of load impedances of the internal or retrievable antenna can be determined by empirical analysis.

With the flip open a user is likely to hold the bottom flip 802 with one hand while positioning the top flip 804 near the user's ear when an audio system of the phone 800, such audio system 112 of FIG. 1, is set to low volume, and voice channel is active. If, on the other hand, the audio system 112 is in speakerphone mode, it is likely that the user is positioning the top flip 804 away from the user's ear. In these arrangements, different ranges of load impedances can be experienced by the internal or retrievable antenna, which can be analyzed empirically. The low and high volume states of the audio system 112, as well as, a determination that a voice channel is active illustrates varying functional use cases.

Figure 9:
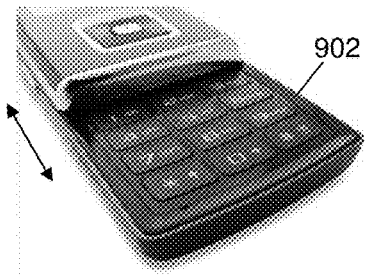
Figure 10:
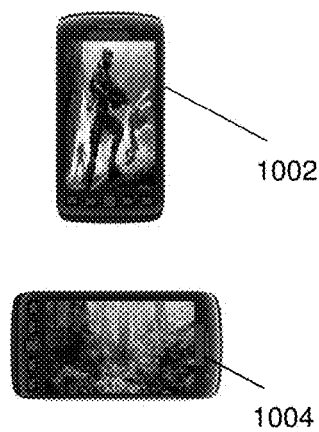
Figure 11:
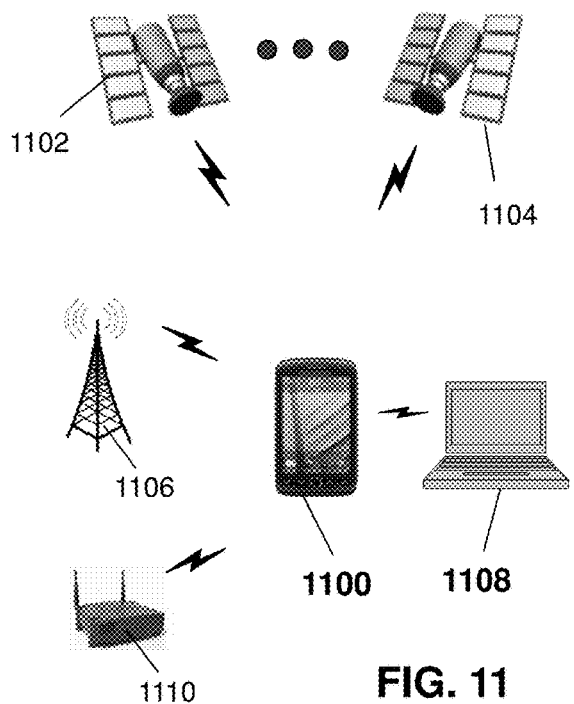

For a phone 900 with a slideable keypad 902 (illustrated in FIG. 9), the keypad in an outward position can present one range of load impedances of an internal antenna, while the keypad in a hidden position can present another range of load impedances, each of which can be analyzed empirically. For a smartphone 1000 (illustrated in FIG. 10) presenting a video game, an assumption can be made that the user is likely to hold the phone away from the user's ear in order to view the game. Placing the smartphone 1000 in a portrait position 1002 can represent one physical and operational use case, while utilizing the smartphone 1000 in a landscape position 1004 presents another physical and operational use case.

The number of hands and fingers used in the portrait mode may be determined by the particular type of game being played by the user. For example, a particular video game may require a user interface where a single finger in portrait mode may be sufficient for controlling the game. In this scenario, it may be assumed that the user is holding the smartphone 1000 in one hand in portrait mode and using a finger with the other. By empirical analysis, a possible range of impedances of the internal antenna(s) of the communication device can be determined when using the video game in portrait mode. Similarly, if the video game selected has a user interface that is known to require two hands in landscape mode, another estimated range of impedances of the internal antenna can be determined empirically.

A multimode phone 1100 capable of facilitating multiple access technologies such as GSM, CDMA, LTE, WiFi, GPS, and/or Bluetooth in two or more combinations can provide additional insight into possible ranges of impedances experienced by two or more internal antennas of the multimode phone 1100. For example, a multimode phone 1100 that provides GPS services by processing signals received from a constellation of satellites 1102, 1104 can be empirically analyzed when other access technologies are also in use. Suppose, for instance, that while navigation services are enabled, the multimode phone 1100 is facilitating voice communications by exchanging wireless messages with a cellular base station 1106. In this state, an internal antenna of the GPS receiver may be affected by a use case of a user holding the multimode phone 1100 (e.g., near the user's ear or away from the user's ear). The effect on the GPS receiver antenna and the GSM antenna by the user's hand position can be empirically analyzed.

Suppose in another scenario that the antenna of an LTE transceiver is in close proximity to the antenna of a WiFi transceiver. Further assume that the LTE frequency band used to facilitate voice communications is near the operational frequency of the WiFi transceiver. Also assume that a use case for voice communications may result in certain physical states of the multimode phone 1100 (e.g., slider out), which can result in a probable hand position of the user of the multimode phone 1100. Such a physical and functional use case can affect the impedance range of the antenna of the WiFi transceiver as well as the antenna of the LTE transceiver.

A close proximity between the WiFi and LTE antennas and the near operational frequency of the antennas may also result in cross-coupling between the antennas. Mutual or cross-coupling under these circumstances can be measured empirically. Similarly, empirical measurements of the impedances of other internal antennas can be measured for particular physical and functional use configurations when utilizing Bluetooth, WiFi, Zigbee, or other access technologies in peer-to-peer communications with another communication device 1108 or with a wireless access point 1110. In diversity designs such as multiple-input and multiple output (MIMO) antennas, physical and functional use cases of a communication device can be measured empirically to determine how best to configure a tunable circuit 122 such as shown in FIG. 1.

The number of physical and functional use cases of a communication device 100 can be substantial when accounting for combinations of access technologies, frequency bands, antennas of different access technologies, antennas configured for diversity designs, and so on. These combinations, however, can be empirically analyzed to determine load impedances of the antenna(s), mutual coupling between them, and the effects on transmitter and receiver performance metrics. Mitigation strategies to reduce mutual coupling, counter the effect of varying load impedances, and to improve other performance metrics of the transceiver 102 can also be determined empirically. The empirical data collected and corresponding mitigation strategies can be recorded in the look-up table of FIG. 7 and indexed according to combinations of physical and functional use cases detected by the communication device 100. The information stored in the look-up table can be used in open-loop RF tuning applications to initialize tunable circuit components of the transceiver 102, as well as, closed loop tuning algorithms that control operational aspects of the tunable circuit components.

Figure 12:
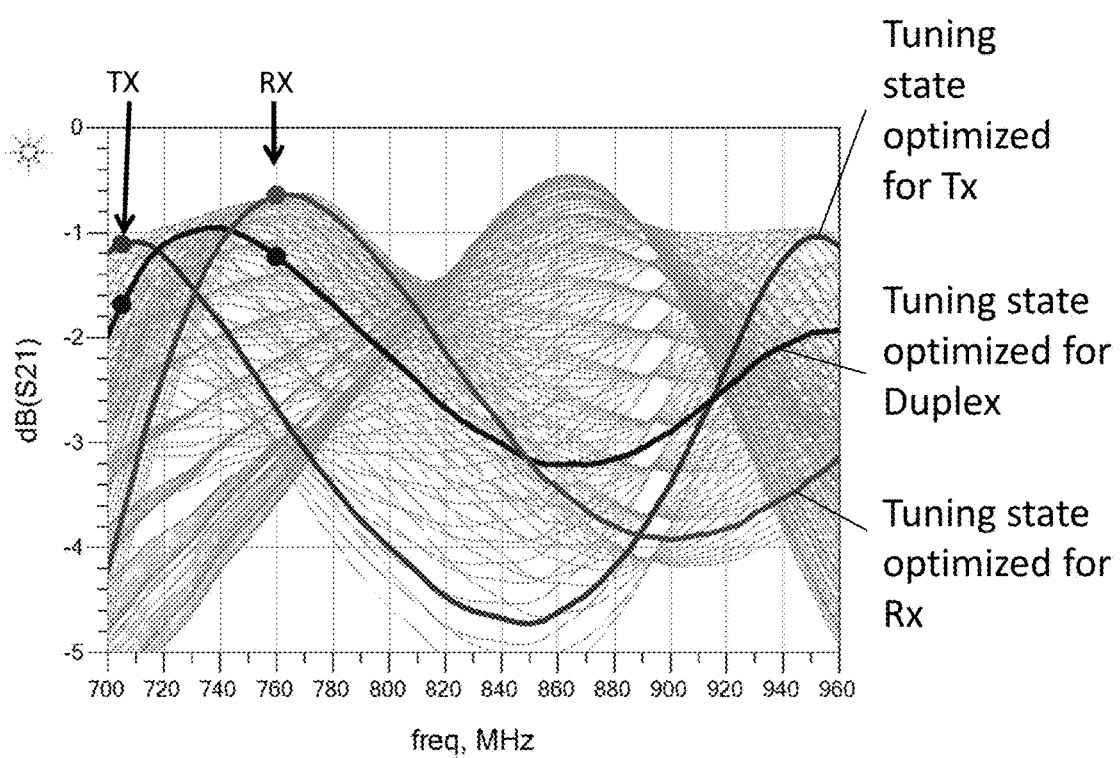
FIGS. 12-15 depict illustrative embodiments of tuning state solution that can be utilized for dynamic tuning.

FIG. 12 depicts an illustrative embodiment of groups of tuning state solutions 1200 over operating frequencies of 700-960 MHz for a particular communication device. The tuning state solutions 1200 can represent tuning configurations for a matching network of the particular communication device, such as tuning settings for variable reactive elements (e.g., tuning voltages for voltage tunable dielectric capacitors, switch settings for tunable-via-switching capacitor circuits, and so forth). In one or more embodiments, these tuning state solutions 1200 can be optimized for various communications, such as a group of first tuning state solutions optimized for Tx operation, a group of second tuning state solutions optimized for Rx operation, and a group of third tuning state solutions optimized for duplex operation. In another embodiment, the tuning state solutions 1200 can be targeted to improve performance in various communications, such as the group of first tuning state solutions targeting Tx operation, the group of second tuning state solutions targeted to Rx operation, and the group of third tuning state solutions targeted to duplex operation. In this embodiment, targeted solutions may be less than an optimum solution, such as within a threshold of an optimum solution. In one or more embodiments, the tuning state solutions 1200 can be pre-determined data, such as determined at a time of manufacture and provisioned into a memory of the communication device, including for use during FDD communication.

Figure 13:
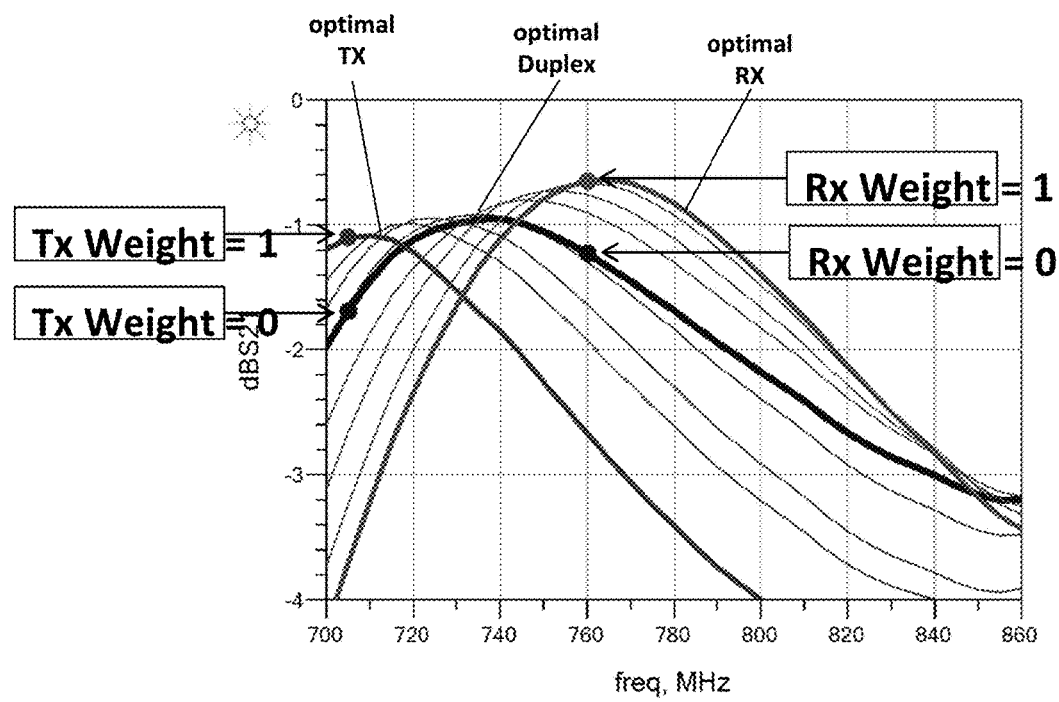

FIG. 13 depicts an illustrative embodiment of groups of tuning state solutions 1300 over operating frequencies of 700-860 MHz for a particular communication device. The tuning state solutions 1300 can represent tuning configurations for a matching network of the particular communication device, such as tuning settings for variable reactive elements, which in this embodiment have been optimized for Tx operation, Rx operation, and duplex operation. In one embodiment, the tuning state solutions 1300 can be predetermined information stored in a memory of the communication device and accessible during tuning for determining a desired tuning configuration for the matching network. The tuning state solutions 1300 enable a processor of the communication device to apply weighting to the solutions to determine the desired tuning configuration for the matching network. For instance, the tuning state solutions 1300 can be applied to FDD communications.

For example utilizing a linear interpolation, a Tx weighting (TxW) can be applied to the selected predetermined Tx and duplex solutions that are stored in the memory to determine a tuning state (DAC) for the matching network:

$$DAC=TxW*TxDAC+(1-TxW)*DuplexDAC$$

In this example, the TxW is utilized to interpolate between the stored values for the optimal Tx and optimal duplex operation. FIG. 13 illustrates a TxW of 1.0 where the tuning state is the optimal Tx solution and further illustrates a TxW of 0 where the tuning state is the optimal duplex solution. In this example, the determination of the appropriate weighting is utilized for biasing the tuning state between optimal Tx and duplex operation.

In another example, an Rx weighting (RxW) can be applied to the selected predetermined Tx and duplex solutions that are stored in the memory to determine a tuning state (DAC) for the matching network:

$$DAC=RxW*RxDAC+(1-RxW)*DuplexDAC$$

In this example, the RxW is utilized to interpolate between the stored values for the optimal Rx and optimal duplex operation. FIG. 13 illustrates a RxW of 1.0 where the tuning state is the optimal Rx solution and further illustrates a RxW of 0 where the tuning state is the optimal duplex solution. In this example, the determination of the appropriate weighting is utilized for biasing the tuning state between optimal Rx and duplex operation. Other formulas and/or interpolations can also be applied for implementing weighting which may or may not be linear.

In these embodiments, the stored solutions can be in a table in the memory of the communication device and the table tuning values can be DAC values that represent voltage tuning signals to be applied to voltage tunable capacitors. However, the table tuning values can be any values or data (e.g. switch position) that represent a state or configuration for a tunable reactive element to provide a desired level of tuning. In one or more embodiments, the communication device can first determine whether the biasing is towards Tx operation or Rx operation, and can then apply the corresponding Tx or Rx weighting as shown above.

In one or more embodiments, various criteria or combinations of criteria can be utilized to determine weighting to be applied between Tx operation tuning and Rx operation tuning. The criteria can include one or more operational functions such as resource block allocation, modulation type, data throughput, Tx power level, RSSI, RSCP, DTX, battery level, the antenna use case (e.g., closed loop-derived use case determination), and so forth. The operational functions can be measurable criteria that are determined in real-time so that real-time or near-real-time tuning can be performed. The tuning can be dynamic such that a detected change in an operational function (e.g., a change in data throughput during an FDD communication session) can trigger an adjustment to Tx and/or Rx weighting applied during tuning. In one or more embodiments, the dynamic adjustments can be performed in combination with static Tx/Rx weighting adjustments made in a design phase, such as based on Margin to OTA specs or TRP vs. TIS. In one or more embodiments, one or more first operational functions can be utilized to determine in which direction to bias the match (i.e., towards the Tx tuning state solution or towards the Rx tuning state solution). Then, one or more second operational functions can be utilized to determine the amount of the weighting to be used for interpolation (e.g., between 0 to 1.0). Other techniques can be utilized for determining an amount of weighting, such as determining the weighting amount according to an analysis of a particular operational function with respect to an operational threshold. For instance, a processor of a communication device can utilize a full weighting (1.0) towards the Rx tuning state solution (e.g., the matching network is tuned according to a selected tuning configuration that is optimized for Rx operation) where an amount of expected data to be received is estimated to be above a first threshold but utilizing other weightings less than 1.0 depending on the amount of expected data to be received.

In one embodiment, a measurement-based weighting determination can be made based on RSSI. For example, an RSSI determination can be made. If the RSSI is within a threshold (e.g., 10 dB) of sensitivity, then a weighting bias of the match towards the Rx tuning state solution can be done. If the RSSI is within another threshold (e.g., 10-15 dB) from sensitivity, then duplex matching can be utilized. If the RSSI is more than yet another threshold (e.g., 15 dB from sensitivity), then a weighting bias of the match towards the Tx tuning state solution can be done.

Figure 14:
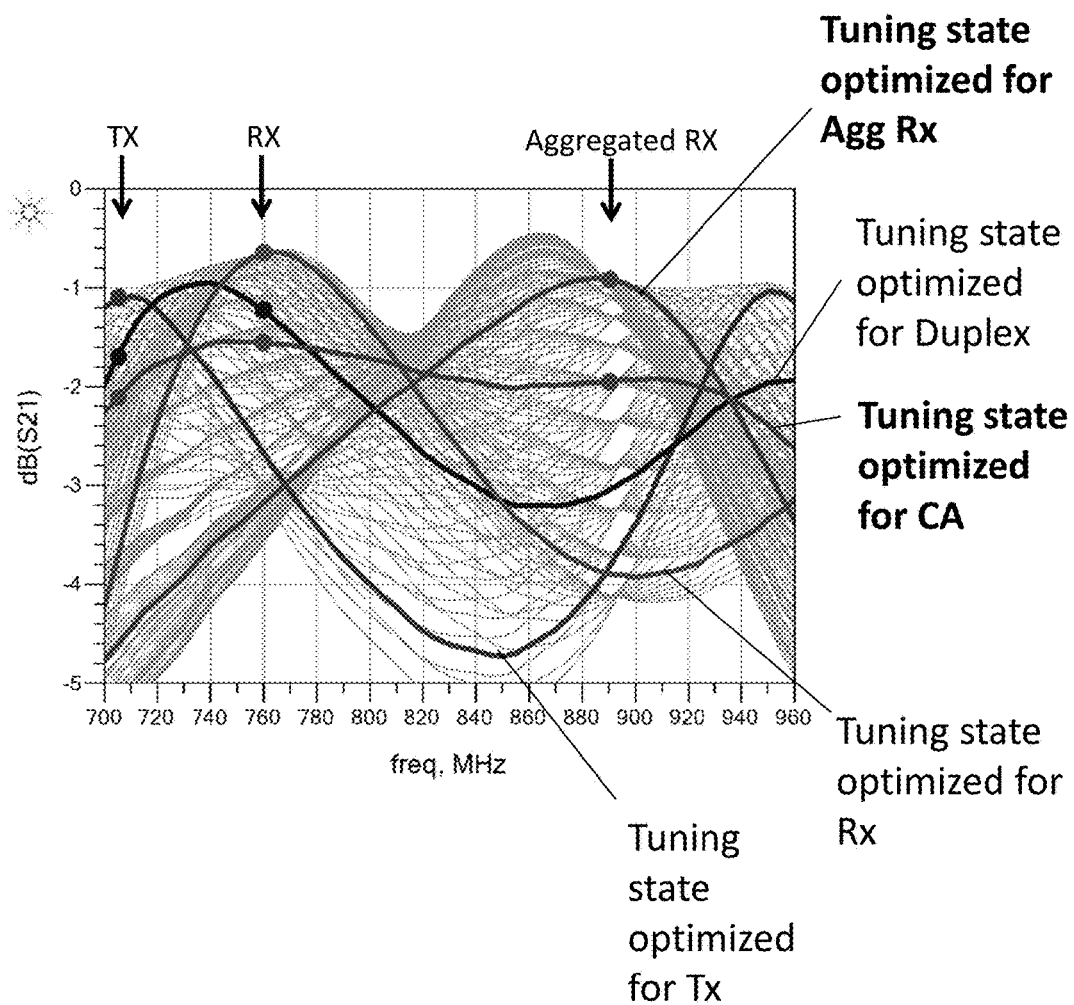

FIG. 14 depicts an illustrative embodiment of groups of tuning state solutions 1400 over operating frequencies of 700-960 MHz for a particular communication device that can be utilized during carrier aggregation operation. The tuning state solutions 1400 can represent tuning configurations for a matching network of a particular communication device, such as tuning settings for variable reactive elements (e.g., tuning voltages for voltage tunable dielectric capacitors, switch settings for tunable-via-switching capacitor circuits, and so forth). In one or more embodiments, these tuning state solutions 1400 can be optimized for various communications, such as a group of first tuning state solutions optimized for Tx operation, a group of second tuning state solutions optimized for Rx operation, a group of third tuning state solutions optimized for duplex operation, a group of fourth tuning state solutions optimized for aggregated Rx operation, and a group of fifth tuning state solutions optimized for carrier aggregation which considers operation at all of the carriers being used. In this example the carrier aggregation tuning state considers simultaneous operation at the Tx frequency, Rx frequency and aggregated Rx frequency. In another embodiment, targeted solutions can be utilized in place of optimal solutions where the targeted solutions may be less than an optimum solution, such as within a threshold of an optimum solution. In one or more embodiments, the tuning state solutions 1400 can be pre-determined data, such as determined at a time of manufacture and provisioned into a memory of the communication device, including for use during FDD and/or carrier aggregation communication. In one embodiment, two or more states of the groups of tuning state solutions can be interpolated between utilizing weighting factors to determine a tuning configuration. The weighting factors can be determined based on various criteria, such as described above with respect to FIG. 13.

Figure 15:
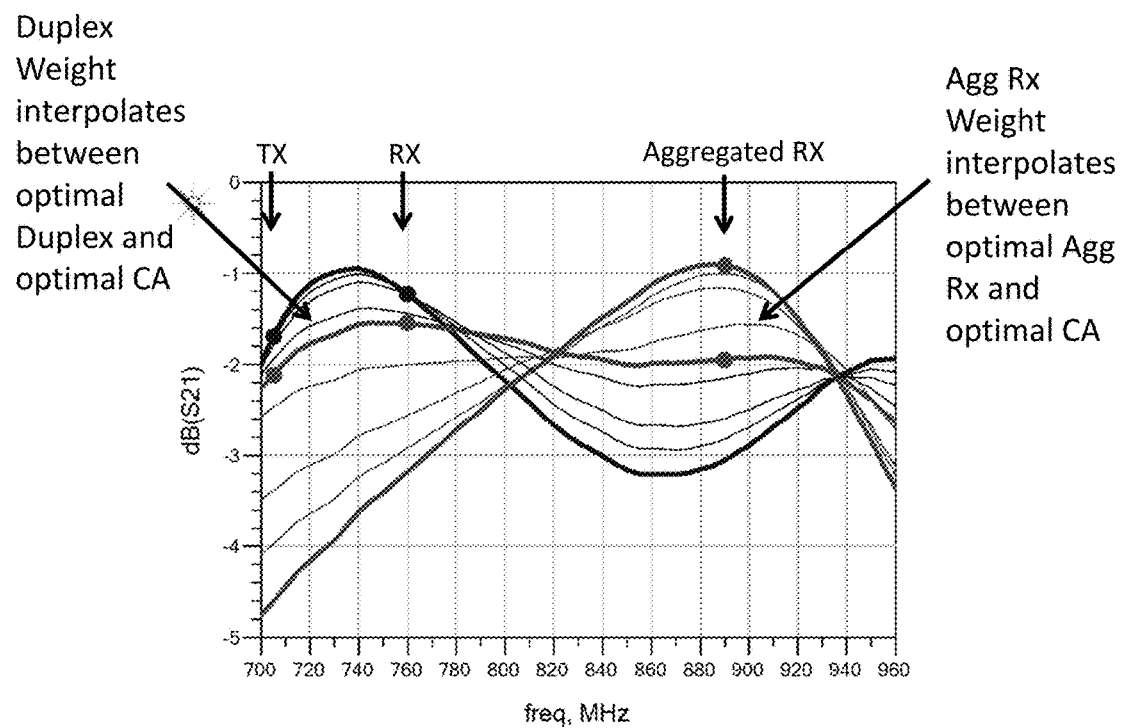

FIG. 15 depicts an illustrative embodiment of groups of tuning state solutions 1500 over operating frequencies of 700-960 MHz for a particular communication device. The tuning state solutions 1500 can represent tuning configurations for a matching network of the particular communication device, such as tuning settings for variable reactive elements, which in this embodiment have been optimized for carrier aggregation operation, aggregated Rx operation, and duplex operation. In one embodiment, the tuning state solutions 1500 can be predetermined information stored in a memory of the communication device and accessible during tuning for determining a desired tuning configuration for the matching network. The tuning state solutions 1500 enable a processor of the communication device to apply weighting to the solutions to determine the desired tuning configuration for the matching network. The tuning state solutions 1500 can be applied to FDD and carrier aggregation communications.

As an example for FIG. 15, various criteria or combinations of criteria can be utilized to determine weighting to be applied between carrier aggregation operation, aggregated Rx operation, and duplex operation, where such weighting provides a bias for improved performance towards the particular type of operation. The weighting criteria can include one or more operational functions such as resource block allocation of each carrier, modulation type of each carrier, data throughput, Tx power level, RSSI for each carrier, RSCP for each carrier, DTX, battery level, the antenna use case (e.g., closed loop-derived use case determination), and so forth. The operational functions can be measurable criteria that are determined in real-time so that real-time or near-real-time tuning can be performed.

The tuning can be dynamic such that a detected change in an operational function (e.g., a change in data throughput during an FDD/carrier aggregation communication session) can trigger an adjustment to carrier aggregation weighting, aggregated Rx weighting, and duplex weighting applied during tuning. In one or more embodiments, the dynamic adjustments can be performed in combination with static weighting adjustments made in a design phase, such as based on Margin to OTA specs. For instance, duplex weighting can be determined and then utilized to interpolate between an optimal duplex tuning state solution (e.g., selected and stored in memory) and an optimal carrier aggregation tuning state solution (e.g., selected and stored in memory). In another example, aggregated Rx weighting can be determined and then utilized to interpolate between an optimal aggregated Rx tuning state solution (e.g., selected and stored in memory) and an optimal carrier aggregation tuning state solution (e.g., selected and stored in memory).

In one or more embodiments for carrier aggregation, one or more first operational functions can be utilized to determine in which direction to bias the match (e.g., towards the optimal aggregated Rx tuning state solution tuning state solution or towards the optimal duplex tuning state solution). Then, one or more second operational functions can be utilized to determine the amount of the weighting to be used for interpolation (e.g., between 0 to 1.0). Other techniques can be utilized for determining an amount of weighting, such as determining the weighting amount according to an analysis of a particular operational function with respect to an operational threshold. For instance, a processor of a communication device can utilize a full weighting (1.0) towards the optimal aggregated Rx tuning state solution (e.g., the matching network is tuned according to a selected tuning configuration that is optimized for aggregated Rx operation) where an amount of expected data to be received is estimated to be above a first threshold but utilizing other weightings less than 1.0 depending on the amount of expected data to be received. The carrier aggregation example in FIGS. 14-15 shows a primary band consisting of Tx and Rx and an aggregated band consisting of Rx. The carriers in the primary band are primary component carriers and the carriers in the aggregated bands are secondary component carriers. In this example, the UL has a primary component carrier and the DL has a primary component carrier and a secondary component carrier. This is referred to as downlink carrier aggregation because an additional Rx carrier is aggregated with the primary component carrier to increase the downlink bandwidth. Carrier aggregation can also be used in the uplink by aggregating additional Tx carriers to increase the uplink bandwidth. It should be understood that the embodiments described here can be used for DL carrier aggregation and UL carrier aggregation. The carrier aggregation example in FIGS. 14-15 shows one secondary component carrier. Currently, the 3GPP standards specify up to 4 secondary component carriers can be aggregated with the primary component carrier allowing simultaneous reception over 5 bands. This trend of increased aggregation is likely to continue to expand in future systems. In such a configuration it would be advantageous to store tuning states for each aggregated band or group of aggregated bands and apply dynamic weighting to these states. It should be understood that the embodiments described here can apply to any number of aggregated bands. In general, these techniques apply to any system that require simultaneous operation at multiple frequency bands. A simple example being FDD operation with Tx and Rx frequency bands and a more complex, but still common, example being carrier aggregation with two UL carriers and four DL carriers.

Figure 16:
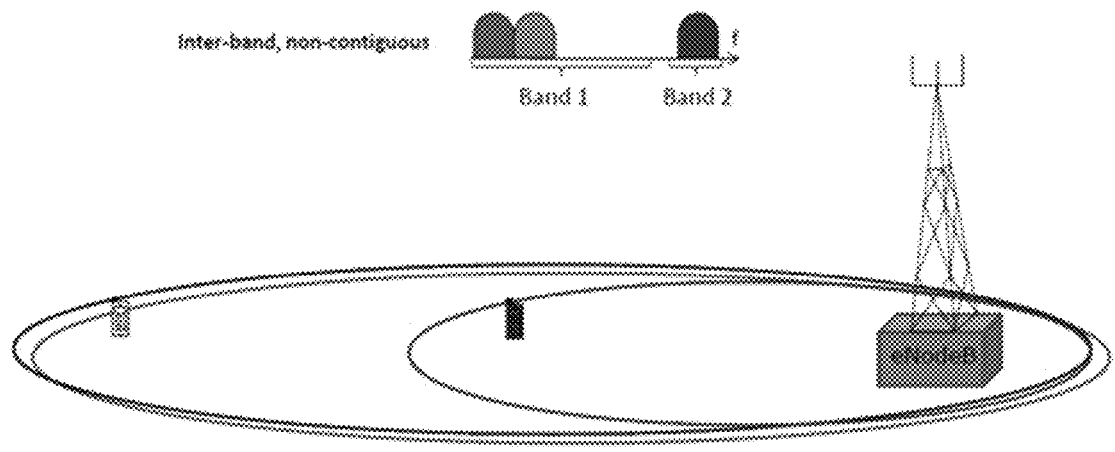
FIGS. 16-17 depict illustrative embodiments of carrier aggregation that can utilizing dynamic tuning.
Figure 17:
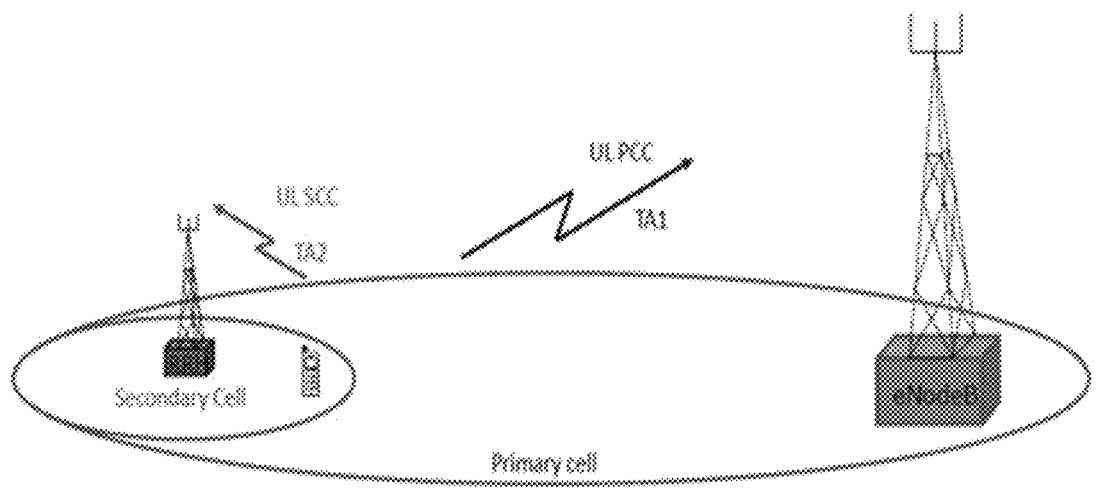

Referring to FIGS. 16-17, link margins can be different for each carrier in carrier aggregation communications, particularly since an aggregated band may have a different serving cell. Thus, weighting the match differently for each aggregated band as in the exemplary embodiments can be beneficial. Additionally, the compromise in matching to simultaneously match all aggregated bands can be more significant than the compromise for duplex tuning. In the illustrations of FIGS. 16-17, each component carrier can correspond to a serving cell. The different serving cells may have different coverage.

Figure 18:
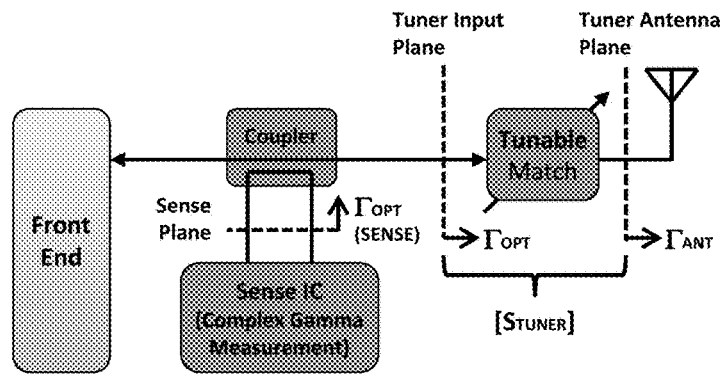
FIGS. 18-22 depict communication devices that provide dynamic tuning and depict graphical representations of tuning grids utilized for the tuning.
Figure 19:
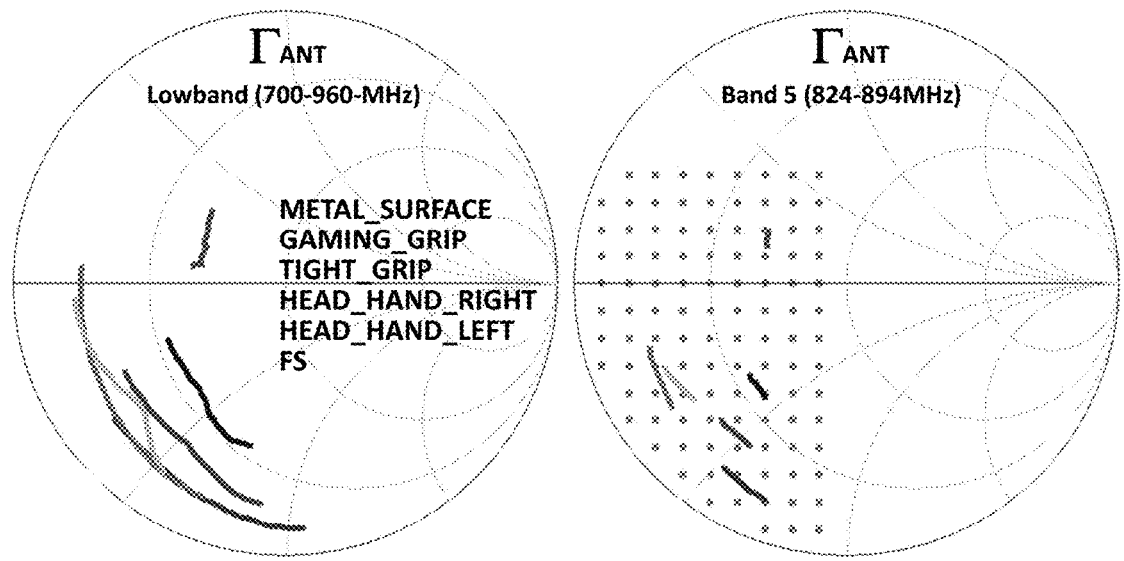

Referring to FIGS. 18-19, one or more of the exemplary embodiments can utilize a two-dimensional algorithm for tuning. FIG. 18 illustrates a schematic of a portion of a communication device 1800 along with corresponding Smith charts 1900 for the device's operation. The antenna S11 parameter for all use cases can be examined in each band (or subband). For each band, a tuning grid in the antenna plane can be set or determined to sufficiently cover the entire range of use cases. $\Gamma_{ANT}$ is antenna S11 at the antenna plane. $\Gamma_{OPT}$ is tuner S11 at the tuner input plane for each $\Gamma_{ANT}$ with the optimal tuning state applied to the tuner for each $\Gamma_{ANT}$. $\Gamma_{OPT(SENSE)}$ is $\Gamma_{OPT}$ as measured by the Sense IC at the Sense plane.

FIGS. 18 and 19 illustrate an example implementation of 2D tuning. The tuning domain can be on a 2-dimensional grid in the Antenna Gamma space which sufficiently covers all antenna uses cases. The grid can be rectangular, polar, or annular, and is not required to be uniform. Each grid location can correspond to the antenna gamma at the Tx frequency. For each grid location, the antenna gamma at the Rx frequency can be estimated based on S-parameter characterization of the antenna. For each grid location, the tuner S-parameters can be evaluated at all tuning states and the optimal tuning state (e.g., a set of DAC values) can be recorded in a table or other data structure. There can be any number of DACs (e.g., 3 or more) for each tuning state, but the search can still be 2-dimensional in the gamma space. The optimal or improved tuning state can be optimized or improved for Tx, Rx, both Tx and Rx, or other operations such as carrier aggregation. A compromise between operational parameters and/or Tx and Rx mode can also be utilized during the tuning.

Figure 20:
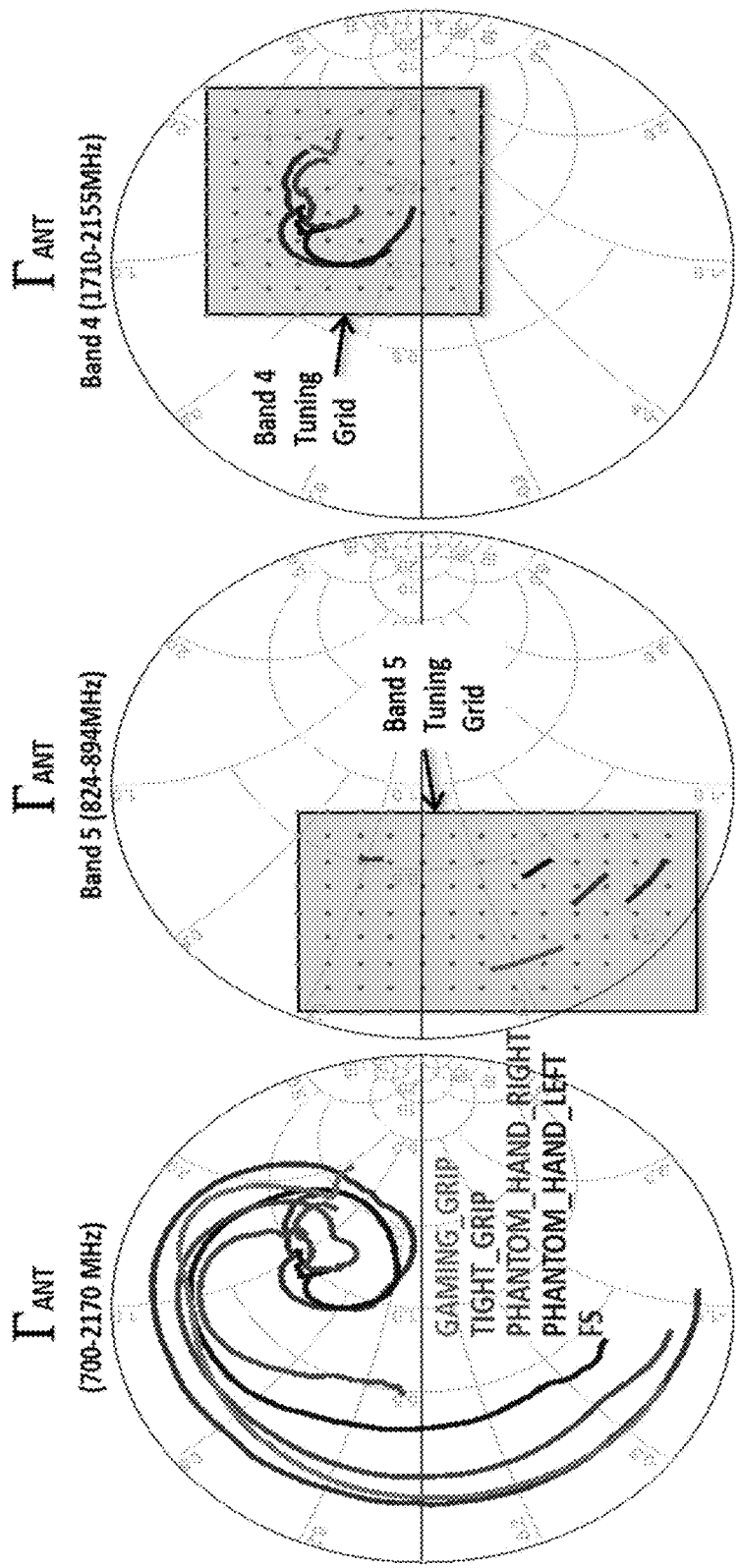

FIG. 20 illustrates tuning grids 2000 established and utilized for bands 4 and 5. The antenna S11 for all use cases can be examined in each band (or subband). For each band, a tuning grid in the antenna plane is set to sufficiently cover the entire range of use cases.

Figure 21:
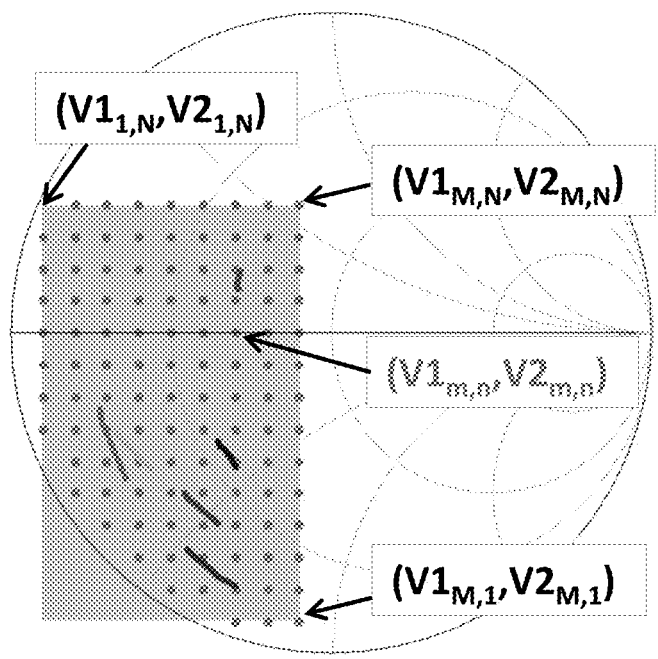

Referring to FIG. 21, tuning grid 2100 is illustrated for 2D tuning for a tuner with two voltage controlled capacitors (or other tunable reactive elements) is illustrated. V1 and V2 can be determined in advance and stored in a lookup table in the communication device for each point in the 2D, M×N grid. V1 and V2 can be restricted to the pairs listed in the table. The tuning can be performed in the 2D grid space varying m and n. V1 and V2 can be retrieved from the lookup table based on the grid position. In one embodiment, V1 and V2 may not vary independently. M and n can be the two independent variables and V1 and V2 can be strictly dependent on m and n.

Figure 22:
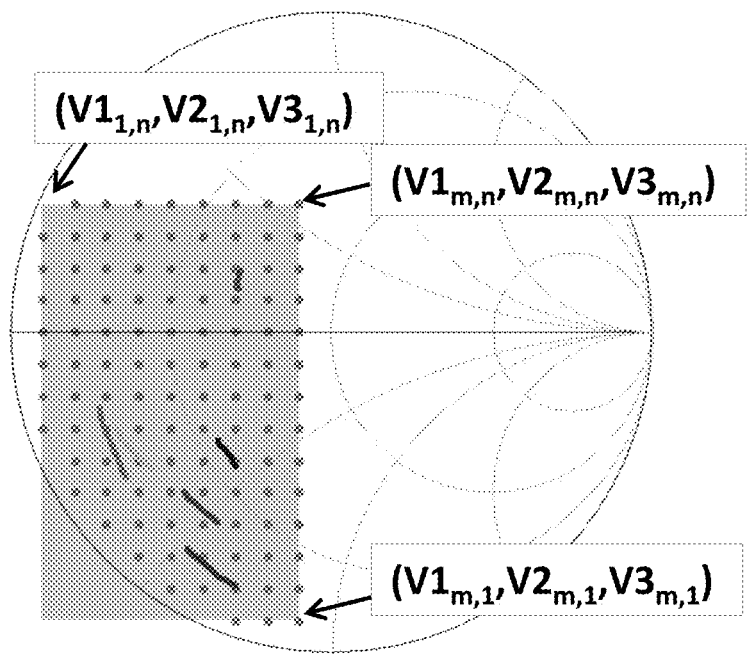

Referring to FIG. 22, 2D tuning for a tuner with three voltage controlled capacitors is illustrated in the tuning grid 2200. V1, V2 and V3 can be determined in advance and stored in a lookup table for each point in the 2D, M×N grid.

V1, V2 and V3 can be restricted to the pairs listed in the table. The tuning can be performed in the 2D grid space varying m and n. V1, V2 and V3 can be retrieved from the lookup table based on the grid position. In one embodiment, V1, V2 and V3 may not vary independently. M and n are the two independent variables and V1, V2 and V3 can be strictly dependent on m and n.

By utilizing 2D tuning rather than 3D tuning, even for three tunable reactance devices, the exemplary embodiment can avoid a failure of convergence and/or solutions trapped at local minima. With 3D tuning, determined tuning values can have low reflection loss but high dissipative loss which is still undesired. The 2D tuning algorithm of the exemplary embodiments, filters out such lossy solutions for tuning values.

The 2D tuning described in FIGS. 18-22 can be utilized in conjunction with the dynamic weighting technique (e.g., for duplex communication and/or carrier aggregation communication) described herein. Other examples of 2D tuning and other tuning techniques, as well as other applicable functions (including antenna selection), are described in U.S. application Ser. No. 14/571,928 filed on Dec. 16, 2014, the disclosures of which are hereby incorporated by reference in their entirety.

Figure 23:
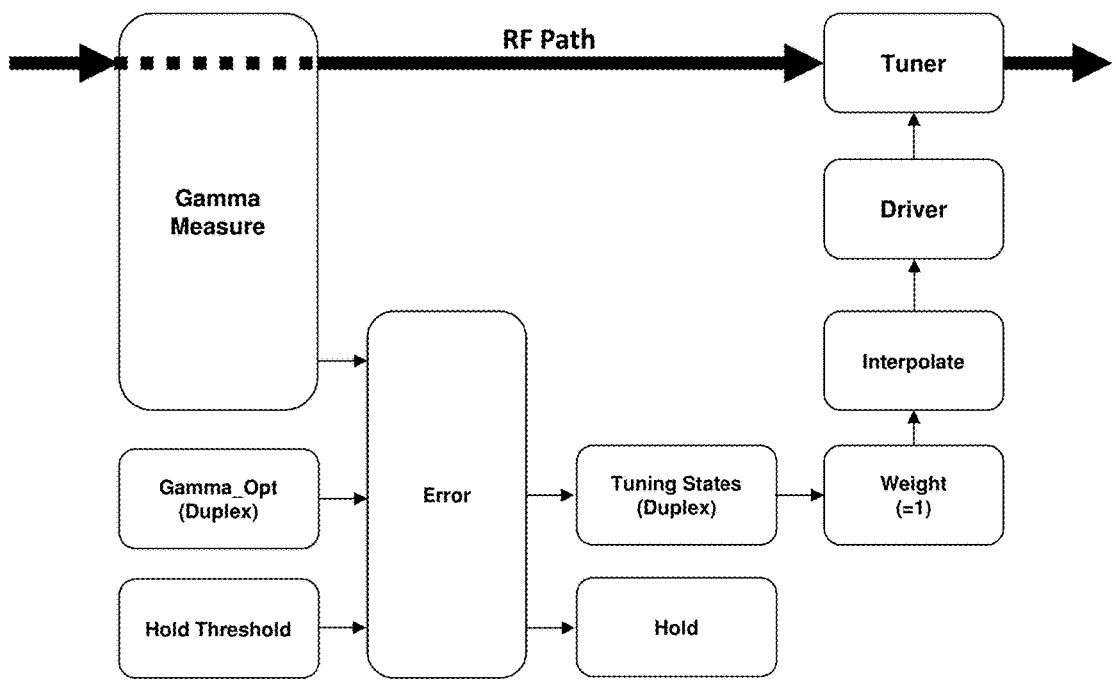
FIGS. 23-33 depict illustrative embodiments of systems and methods that implement dynamic tuning.

Referring to FIG. 23, an example closed loop system 2300 is illustrated that can be utilized for applying a dynamic weighting technique (e.g., for duplex communication and/or carrier aggregation communication) during tuning. System 2300 utilizes gamma as a criteria for weighting of the tuning state solution. In one embodiment, gamma corresponds to an input gamma, such as an input reflection coefficient. Gamma can be a complex parameter (Real, Imaginary) or (Magnitude, Phase) which is used to compute an error function in the closed loop system 2300. An optimal or target (gamma_opt) can be compared to a measured gamma or (S11). Where the measured gamma represents an input reflection coefficient, system 2300 can measure RF return loss and reflected phase may be used to compute the measured gamma.

In one or more embodiments, throughout the closed loop tuning state transitions, the value of gamma_opt may be constant. In one or more other embodiments, the value of gamma_opt can vary as a function of the tuning state. In one or more embodiments, the value of gamma_opt may be predefined in a table for each allowed tuning state. In one or more embodiments, the value of gamma_opt may be interpolated between tuning states. Other network parameters may be used as an alternative to S-parameters, such as Z or Y parameters. For example, Zopt may be stored and then compared to a measured Zin.

Figure 24:
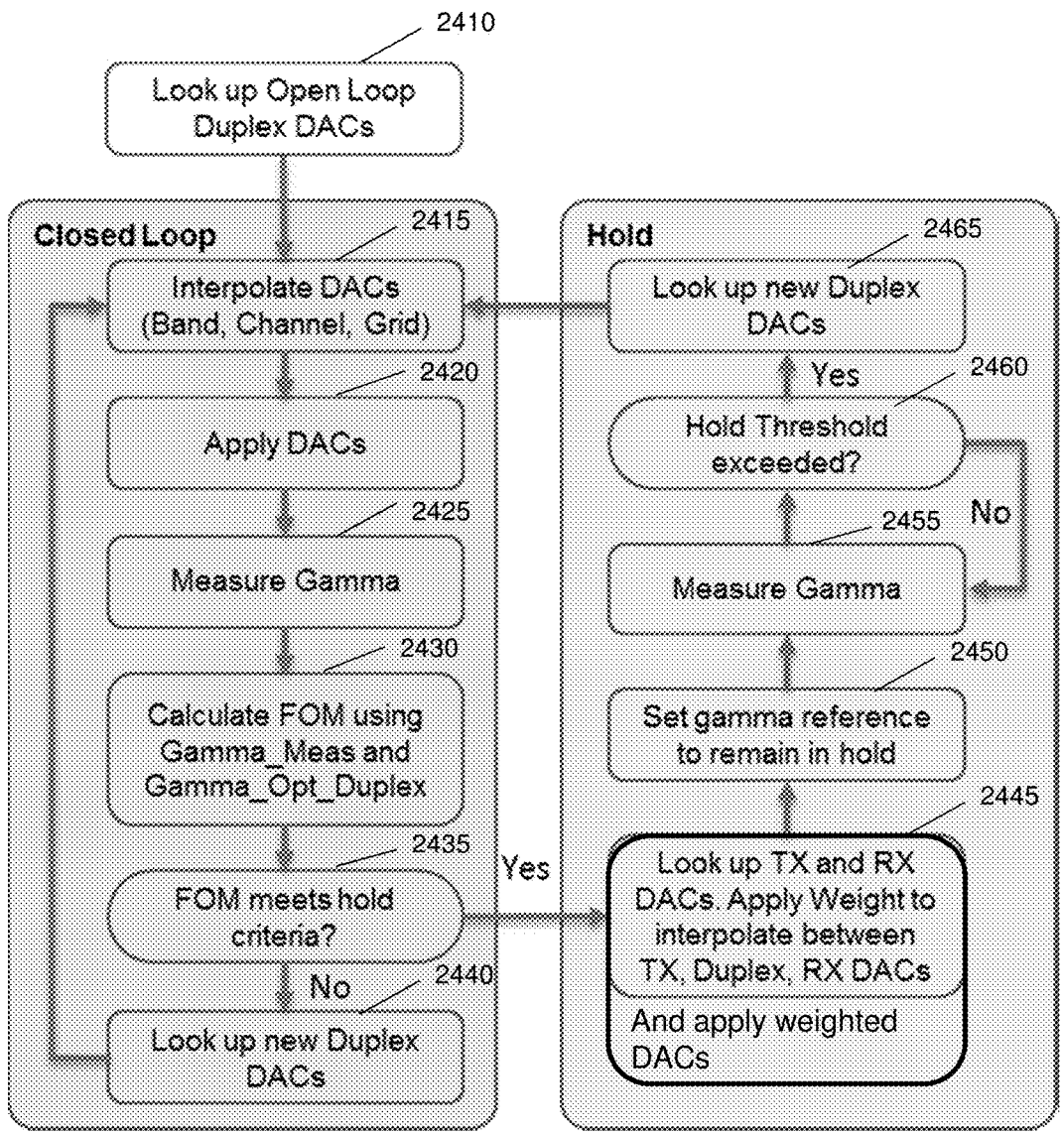
Figure 25:
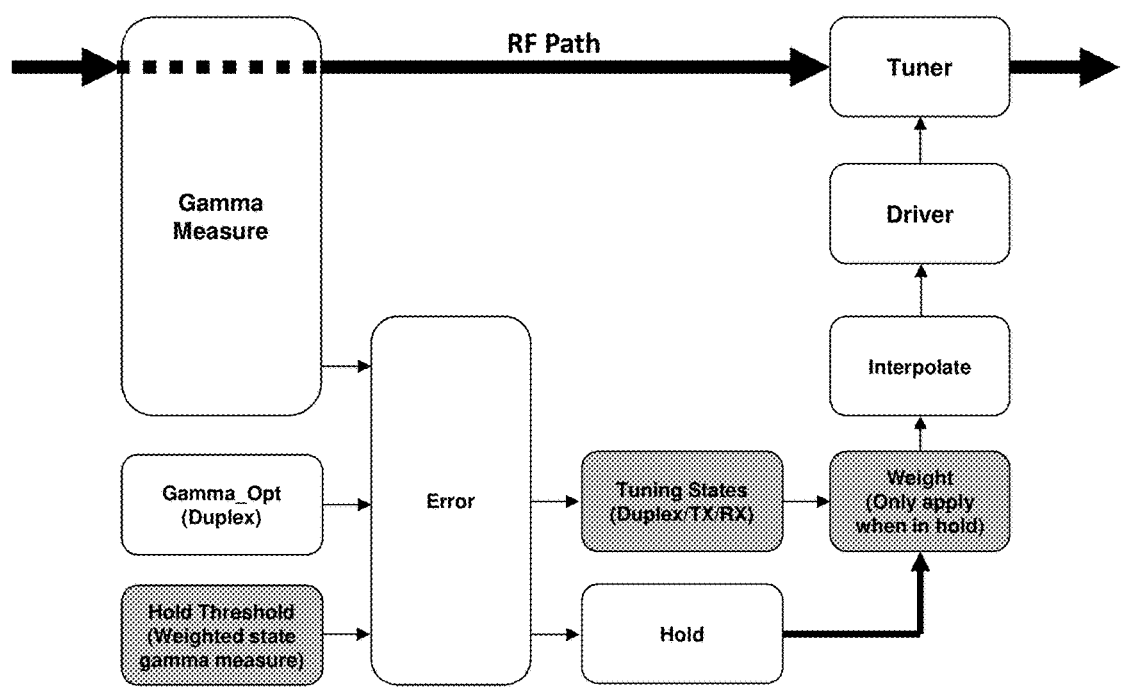

Referring to FIGS. 24-25, an embodiment is illustrated in which system 2500 utilizes a dynamic weighting technique (e.g., for FDD communications) during tuning 2400. Tuning 2400 utilizes gamma_opt with a table (stored in the communication device memory) that contains pre-determined DAC values for optimum or improved performance for duplex, Tx, and Rx operation. In one embodiment, the table can further contain gamma_opt (e.g., expected input reflection coefficient) for duplex only. In this embodiment, a closed loop optimization can find the duplex solution and a Tx/duplex/Rx weight can then be applied after the optimization is determined. Tuning 2400 enables the duplex weighting to be adjusted dynamically, as a function of the real-time conditions of the radio, the link, and/or the current application or usage of the communication device.

In one embodiment, system 2500 has access to a table or other data structure for looking up tuning state solutions (e.g., DACs). In this example, the tuning state solutions are referred to as DAC values, but the tuning state solutions can be any tuning state that is applied to a tunable reactive element to adjust the reactance of the element and thereby implement tuning, such as via the matching network. For instance, optimum DACs can be calculated (e.g., at a time of manufacture or otherwise provisioned to the communication device) such as for duplex, Tx and Rx operation (e.g., at various frequencies). In one or more embodiments, the stored table can be populated with one or more of duplex DACs, Tx DACs and Rx DACs that are optimum or target performance values.

At 2410, duplex DACs can be selected from the table according to a band/channel. In one embodiment at 2415, an interpolation of DACs can be implemented. For example, the table can store low, middle and high channel DAC values per operating frequency and the communication device may be operating therebetween. The number of DAC values can correspond to the particular configuration of the matching network, such as a matching network that has three voltage tunable dielectric capacitors have three DACs.

At 2420, the selected (or interpolated) duplex DACs can be utilized as the tuning configuration and applied to the matching network for tuning, such as adjusting the tuning reactive elements according to the duplex DACs. At 2425, gamma (e.g., input reflection coefficient based on RF return loss and reflected phase) can be measured and can be compared to an expected performance. For example at 2430, a figure of merit can be calculated using the measured gamma and the optimum gamma for duplex operation (gamma_opt_duplex) stored in the table. The figure of merit can be the gamma value or can be based in part on the gamma value, such as taking into account other criteria including maximum phase shifts, maximum tuning steps, and other factors.

At 2435, the figure of merit can be compared to a threshold to determine whether other duplex DAC values are to be utilized or whether the weighting is to be utilized with the current duplex DAC values. In one embodiment, the threshold can be an error threshold associated with the figure of merit that is a static threshold. In another embodiment, the error threshold can be dynamic, such as varying based on various factors, such as communication type (voice, video, data or messaging), communication protocol, network requirements, network conditions, and so forth. In one or more embodiments, the threshold analysis can be a comparison of the measured gamma with the stored gamma_opt_duplex.

If the figure of merit is outside of the error threshold or otherwise does not satisfy the threshold of the figure of merit then at 2440 new duplex DAC values can be determined. For example, a 2D grid can be utilized where a next value is selected for the duplex DAC value. In this example, every band can have its own grid and/or each grid can have its own gamma data. For instance, the next value in the stored grid can be in one of four directions (e.g., right or left and up or down). The particular direction that is utilized can be based on various factors such as based on a coarse tuning gamma point that was previously utilized.

If the figure of merit is within the error threshold or otherwise satisfies the threshold of the figure of merit then at 2445 Tx and Rx DAC values can be selected from the stored table and weighting can be applied to interpolate between the Tx, Rx and duplex DAC values. For example, each grid point can have a Tx DAC value, an Rx DAC value, a duplex DAC value, and a gamma_opt_duplex value in the table. A weighting factor can be determined (e.g., according to an operational function) and the weighting factor can be utilized to determine weighted DAC values from the duplex DAC value that are biased towards the Tx DAC value or the Rx DAC value. In one or more embodiments, weighting criteria can include one or more operational functions such as resource block allocation, modulation type, data throughput, Tx power level, RSSI, RSCP, DTX, battery level, the antenna use case (e.g., closed loop-derived use case determination), and so forth. The operational functions can be measurable criteria that are determined in real-time so that real-time or near-real-time tuning can be performed. Other operational functions can include a determined usage of the communication device, such as a determination that the device will be downloading a file of a certain size, or a determination that a particular application is being executed that typically transmits large files. The weighted DAC values can then be utilized for the tuning configuration of the matching network. For instance, the tunable reactive elements can be adjusted according to the weighted DAC values to adjust the tuning.

At 2450, a criteria can be determined for continuing to tune the communication device utilizing the weighted DAC values (i.e., "hold") or for determining new DAC values for tuning. For example, a gamma_reference (e.g., input reflection coefficient based on RF return loss and reflected phase) can be measured after the tuning based on the weighted DAC values is performed. At 2455 and 2460, monitoring of a measured gamma as compared to the gamma_reference can be performed. For example, the measured gamma can be compared to the gamma_reference according to a hold threshold. If the hold threshold is satisfied (e.g., the measured gamma is within a threshold amount of the gamma_reference) then the monitoring continues, but if the hold threshold is not satisfied then new duplex DAC values can be determined at 2465, such as according to the 2D grid described with respect to 2440. Tuning 2400 can then be repeated utilizing the new duplex DAC values.

Tuning 2400 enables duplex tuning to be performed using duplex DACs and a duplex gamma opt. When the hold is reached (e.g., the figure of merit threshold is satisfied), tuning can then be adjusted according to Tx/Rx weight by interpolating between stored duplex, Tx, Rx DACs. After applying weighted DACs, a measurement (e.g., input reflection coefficient based on RF return loss and reflected phase) can be made as a reference for the threshold to exit hold and resume tuning. When the tuning resumes (at 2465), duplex tuning is again implemented until the hold is again reached, and the weighted tuning is applied.

Figure 26:
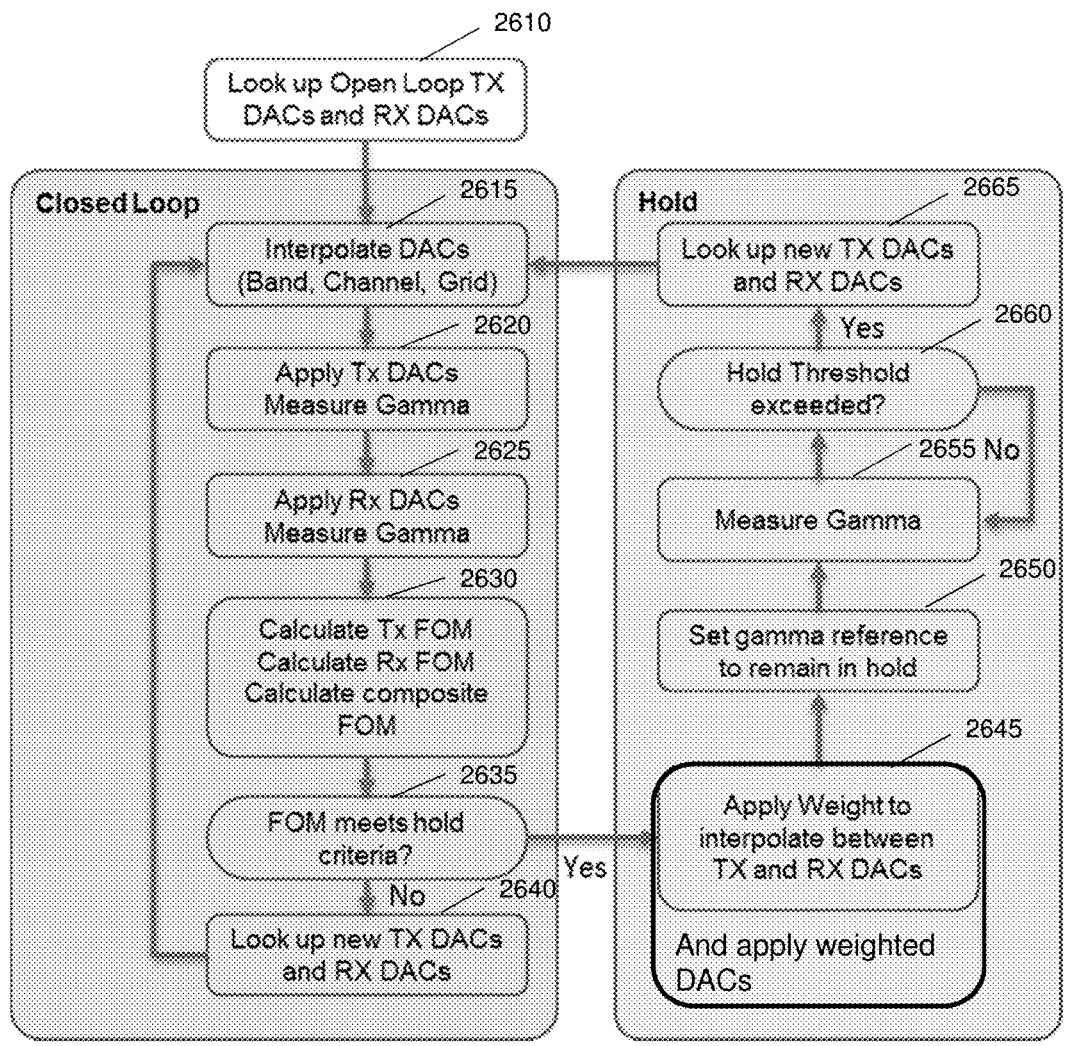
Figure 27:
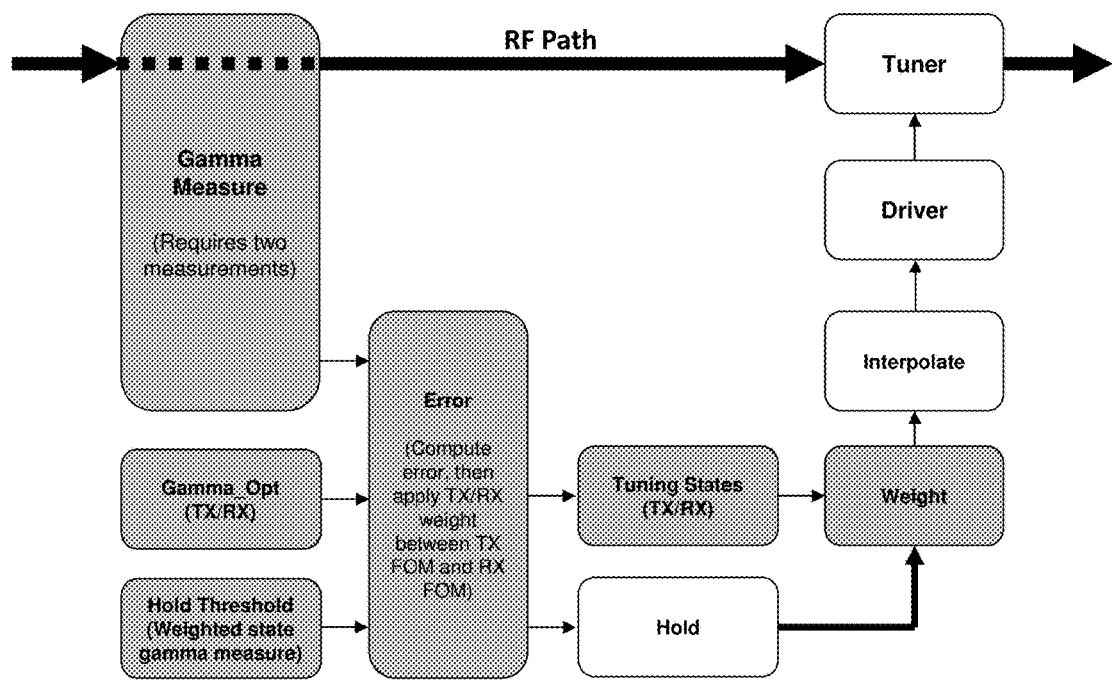

Referring to FIGS. 26-27, another embodiment is illustrated in which system 2700 utilizes a dynamic weighting technique (e.g., for FDD communications) during tuning 2600. Tuning 2600 utilizes gamma_opt with a table (stored in the communication device memory) that contains predetermined DAC values for optimum or improved performance for Tx and Rx operation. The table can further contain gamma_opt (e.g., expected input reflection coefficient) for Tx and Rx, such as indexed to the Tx frequency. In this embodiment, a closed loop optimization can find the Tx and Rx solutions and a Tx/Rx weight can then be applied after the optimization is determined. Tuning 2600 enables the weighting to be adjusted dynamically, as a function of the real-time conditions of the radio, the link, and/or the current application or usage of the communication device.

In one embodiment, system 2700 has access to a table or other data structure for looking up tuning state solutions (e.g., DACs). In this example, the tuning state solutions are referred to as DAC values, but the tuning state solutions can be any tuning state that is applied to a tunable reactive element to adjust the reactance of the element and thereby implement tuning, such as via the matching network. For instance, optimum DACs can be calculated (e.g., at a time of manufacture or otherwise provisioned to the communication device) such as for Tx and Rx operation (e.g., at various frequencies). In one or more embodiments, the stored table can be populated with one or more of Tx DACs and Rx DACs that are optimum or target performance values.

At 2610, Tx and Rx DACs can be selected from the table according to a band/channel. In one embodiment at 2615, an interpolation of these DACs can be implemented. For example, the table can store low, middle and high channel DAC values per operating frequency and the communication device may be operating therebetween. The number of DAC values can correspond to the particular configuration of the matching network, such as a matching network that has three voltage tunable dielectric capacitors have three DACs.

At 2620, the selected (or interpolated) Tx DACs can be utilized as the tuning configuration and applied to the matching network for tuning, such as adjusting the tuning reactive elements according to the Tx DACs. A first gamma (e.g., input reflection coefficient based on RF return loss and reflected phase) can then be measured. At 2625, the selected (or interpolated) Rx DACs can be utilized as the tuning configuration and applied to the matching network for tuning, such as adjusting the tuning reactive elements according to the Rx DACs. A second gamma (e.g., input reflection coefficient based on RF return loss and reflected phase) can then be measured.

At 2630, the first and second gammas can be aggregated. Figures of merit can be calculated using the measured first and second gammas and the corresponding optimum gammas for Tx and Rx operation stored in the table. The figure of merits can be the gamma values or can be based in part on the gamma values, such as taking into account other criteria including maximum phase shifts, maximum tuning steps, and other factors. A composite or aggregate figure of merit can be determined according to the two figures of merit. In one embodiment, a weighting factor can be determined (e.g., according to an operational function) and the weighting factor can be utilized to determine the composite figure of merit. In one or more embodiments, weighting criteria can include one or more operational functions such as resource block allocation, modulation type, data throughput, Tx power level, RSSI, RSCP, DTX, battery level, the antenna use case (e.g., closed loop-derived use case determination), and so forth. The operational functions can be measurable criteria that are determined in real-time so that real-time or near-real-time tuning can be performed. Other operational functions can include a determined usage of the communication device, such as a determination that the device will be downloading a file of a certain size, or a determination that a particular application is being executed that typically transmits large files.

At 2635, the composite figure of merit can be compared to a threshold to determine whether other Tx and Rx DAC values are to be utilized or whether the weighting is to be utilized with the current Tx and Rx DAC values. In one embodiment, the threshold can be an error threshold associated with the composite figure of merit that is a static threshold. In another embodiment, the error threshold can be dynamic, such as varying based on various factors, such as communication type (voice, video, data or messaging), communication protocol, network requirements, network conditions, and so forth. In one or more embodiments, the threshold analysis can be a comparison of the measured composite gamma with a composite gamma_opt calculated from stored gamma_opts for Tx and Rx operation.

If the composite figure of merit is outside of the error threshold or otherwise does not satisfy the threshold of the composite figure of merit then at 2640 new Tx and Rx DAC values can be determined. For example, a 2D grid can be utilized where a next value is selected for the Tx and Rx DAC values. In this example, every band can have its own grid and/or each grid can have its own gamma data. For instance, the next value in the stored grid can be in one of four directions (e.g., right or left and up or down). The particular direction that is utilized can be based on various factors such as based on a coarse tuning gamma point that was previously utilized.

If the composite figure of merit is within the error threshold or otherwise satisfies the threshold of the composite figure of merit then at 2645 the weighting factor can be applied to interpolate or otherwise adjust between the Tx, Rx in conjunction with duplex DAC values stored in the table. The weighted DAC values can then be utilized for the tuning configuration of the matching network. For instance, the tunable reactive elements can be adjusted according to the weighted DAC values to adjust the tuning.

At 2650, a criteria can be determined for continuing to tune the communication device utilizing the weighted DAC values (i.e., "hold") or for determining new Tx and Rx DAC values for tuning. For example, a gamma_reference (e.g., input reflection coefficient based on RF return loss and reflected phase) can be measured after the tuning based on the weighted DAC values is performed. At 2655 and 2660, monitoring of a measured gamma as compared to the gamma_reference can be performed. For example, the measured gamma can be compared to the gamma_reference according to a hold threshold. If the hold threshold is satisfied (e.g., the measured gamma is within a threshold amount of the gamma_reference) then the monitoring continues, but if the hold threshold is not satisfied then new Tx and Rx DAC values can be determined at 2665, such as according to the 2D grid described with respect to 2640. Tuning 2600 can then be repeated utilizing the new Tx and Rx DAC values.

Tuning 2600 can utilize a pre-determined stored table that contains DAC values for Tx and Rx, as well as gamma_opt for Tx and Rx. Gamma can be measured with Tx DACs and used to calculate Tx figure of merit while gamma can be measured with Rx DACs and used to calculate Rx figure of merit. In one embodiment, duplex weighting between Tx and Rx can be applied to the figure of merits during optimization. In another embodiment, duplex weighting between Tx and Rx is not applied to the DACs until after optimization. The duplex weighting can be adjusted dynamically, as a function of the real-time conditions of the radio, the link, and/or the current application or usage of the handset.

In one embodiment the table can be generated by calculating optimum DACs for Tx. For each Tx antenna grid point (see 2D grid described herein), Rx ant pair can be derived and optimum DACs for Rx can be calculated. The table can be populated with Tx DACs and Rx DACs, along with a column that is gamma_opt for opt Tx and a column that is gamma_opt for opt Rx. This can be obtained by applying opt RX DACs, applying paired Tx load, and calculating Rx gamma opt at Tx frequency. Tuning 2600 enables using Tx gamma_opt to calculate Tx figure of merit and using Rx gamma_opt to calculate Rx figure of merit. The composite figure of merit can be calculated and weighting can be applied (e.g., to each of the Tx and Rx figures of merit). In one embodiment, weighting can be applied to the DACs throughout the tuning process.

Figure 28:
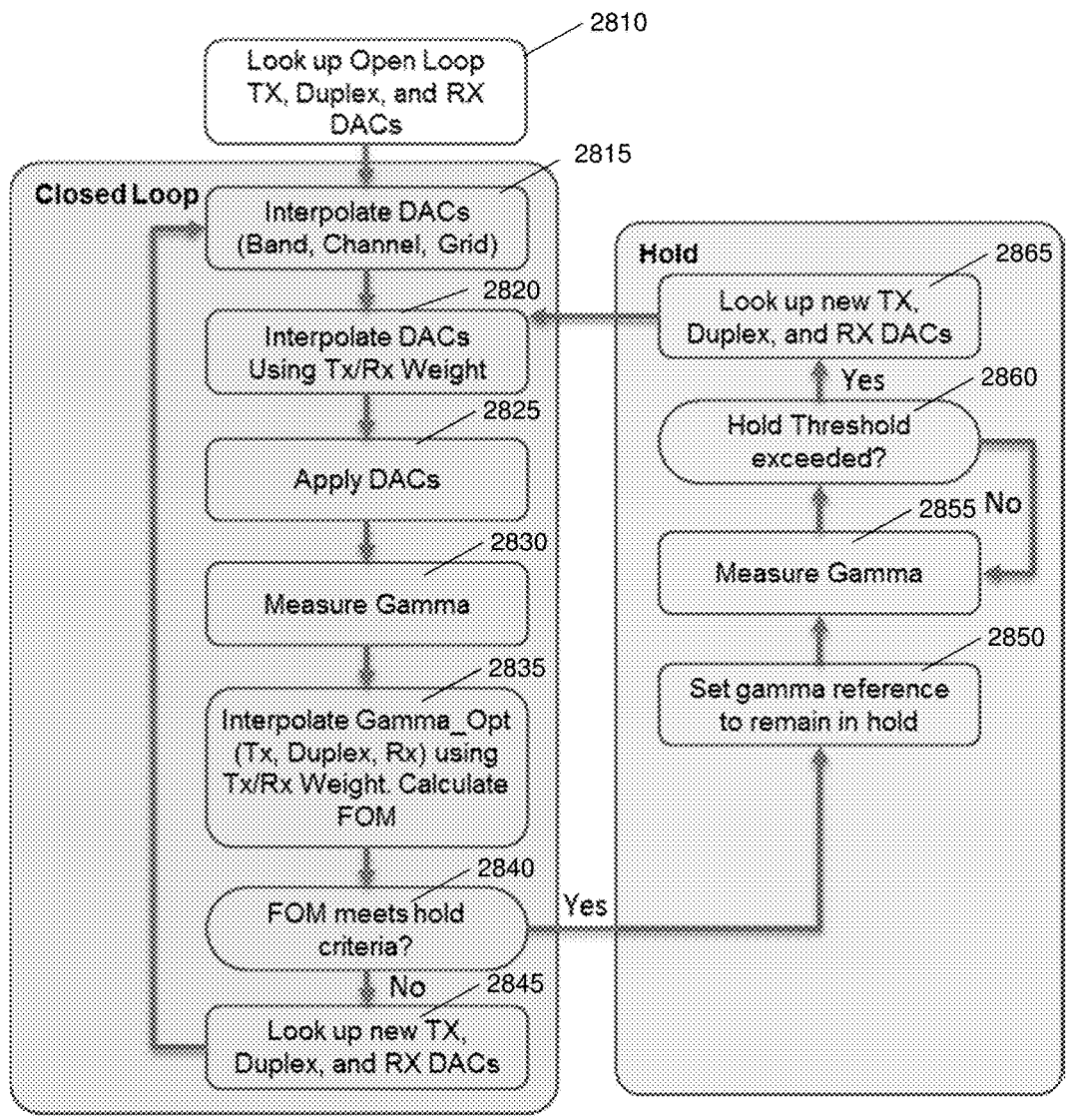
Figure 29:
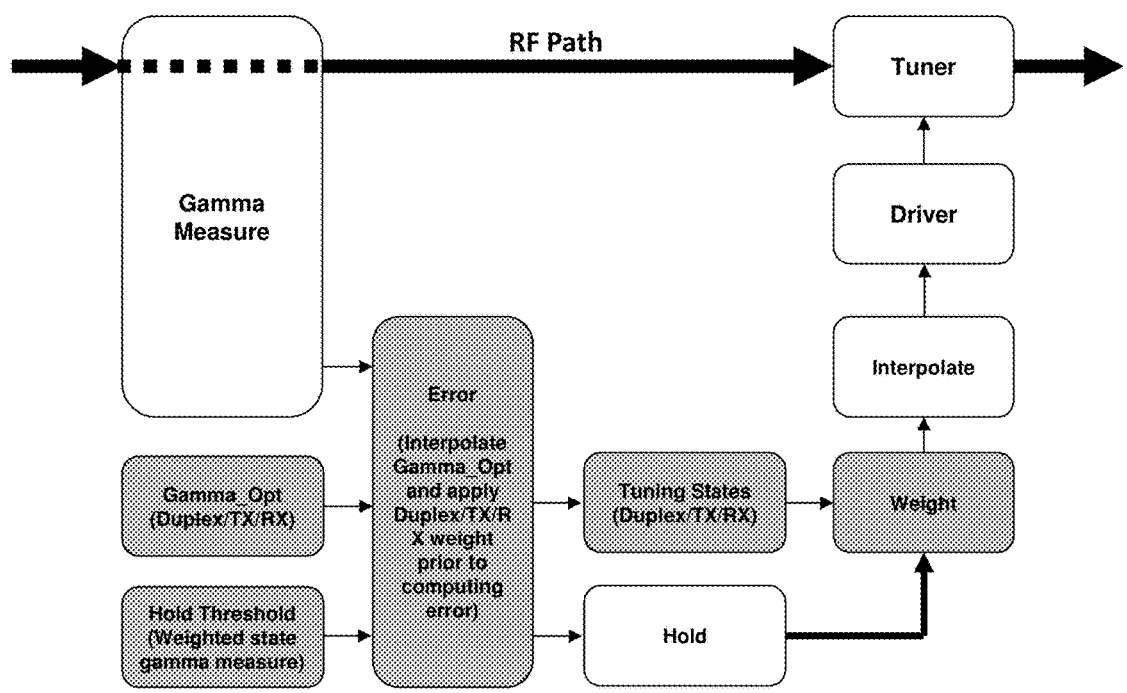

Referring to FIGS. 28-29, another embodiment is illustrated in which system 2900 utilizes a dynamic weighting technique (e.g., for FDD communications) during tuning 2800. Tuning 2800 utilizes gamma_opt with a table (stored in the communication device memory) that contains predetermined DAC values for optimum or improved performance for duplex, Tx, and Rx operation. In one embodiment, the table can further contain gamma_opt (e.g., expected input reflection coefficient) for duplex, Tx and Rx, such as indexed to the Tx frequency. In this embodiment, a closed loop optimization can be performed where weighting factors are applied to both the DACs and the gamma_opts.

In one embodiment, system 2900 has access to a table or other data structure for looking up tuning state solutions (e.g., DACs). In this example, the tuning state solutions are referred to as DAC values, but the tuning state solutions can be any tuning state that is applied to a tunable reactive element to adjust the reactance of the element and thereby implement tuning, such as via the matching network. For instance, optimum DACs can be calculated (e.g., at a time of manufacture or otherwise provisioned to the communication device) such as for duplex, Tx and Rx operation (e.g., at various frequencies). In one or more embodiments, the stored table can be populated with one or more of duplex DACs, Tx DACs and Rx DACs that are optimum or target performance values. Other information can be stored in the table and utilized for tuning, including expected performance metrics, such as expected input reflect coefficients.

At 2810, Tx, Rx and duplex DACs can be selected from the table according to a band/channel. In one embodiment at 2815, an interpolation of DACs can be implemented. For example, the table can store low, middle and high channel DAC values per operating frequency and the communication device may be operating therebetween. The number of DAC values can correspond to the particular configuration of the matching network, such as a matching network that has three voltage tunable dielectric capacitors have three DACs.

At 2820, a further interpolation can be applied to the selected (or interpolated) Tx, Rx and duplex DACs according to a weighting factor to obtain a set of weighted DACs. In one or more embodiments, weighting factor can be based on one or more operational functions such as resource block allocation, modulation type, data throughput, Tx power level, RSSI, RSCP, DTX, battery level, the antenna use case (e.g., closed loop-derived use case determination), and so forth. The operational functions can be measurable criteria that are determined in real-time so that real-time or near-real-time tuning can be performed. Other operational functions can include a determined usage of the communication device, such as a determination that the device will be downloading a file of a certain size, or a determination that a particular application is being executed that typically transmits large files.

At 2825, the weighted DACs can then be utilized as the tuning configuration and applied to the matching network for tuning, such as adjusting the tuning reactive elements according to the weighted DACs. At 2830, gamma (e.g., input reflection coefficient based on RF return loss and reflected phase) can be measured and can be compared to an expected performance. For example at 2835, the expected performance can be weighted according to operational function(s). For instance, an interpolation between stored gamma_opt values for Tx, Rx and duplex operation can be performed according to the weighting factor resulting in a composite weighted gamma_opt value. A figure of merit can be calculated using the measured gamma and the composite weighted gamma_opt value. The figure of merit can be the gamma value or can be based in part on the gamma value, such as taking into account other criteria including maximum phase shifts, maximum tuning steps, and other factors.

At 2840, the figure of merit can be compared to a threshold to determine whether other Tx, Rx and duplex DAC values are to be utilized or whether the current weighted DACs are to continue to be utilized for tuning (i.e., "hold"). In one embodiment, the threshold can be an error threshold associated with the figure of merit that is a static threshold. In another embodiment, the error threshold can be dynamic, such as varying based on various factors, such as communication type (voice, video, data or messaging), communication protocol, network requirements, network conditions, and so forth. In one or more embodiments, the threshold analysis can be a comparison of the measured gamma when the weighted DACs are used for tuning with a composite weighted gamma_opt that is determined from weighting and combining the gamma_opt for Tx, Rx and duplex operation.

If the figure of merit is outside of the error threshold or otherwise does not satisfy the threshold of the figure of merit then at 2845 new Tx, Rx and duplex DAC values are determined. For example, a 2D grid can be utilized where a next value is selected for the DAC values. In this example, every band can have its own grid and/or each grid can have its own gamma data. For instance, the next value in the stored grid can be in one of four directions (e.g., right or left and up or down). The particular direction that is utilized can be based on various factors such as based on a coarse tuning gamma point that was previously utilized.

If the figure of merit is within the error threshold or otherwise satisfies the threshold of the figure of merit then at 2850, a criteria can be determined for continuing to tune the communication device utilizing the weighted DAC values. For example, a gamma_reference (e.g., input reflection coefficient based on RF return loss and reflected phase) can be measured after the tuning based on the weighted DAC values is performed. At 2855 and 2860, monitoring of a measured gamma as compared to the gamma_reference can be performed. For example, the measured gamma can be compared to the gamma_reference according to a hold threshold. If the hold threshold is satisfied (e.g., the measured gamma is within a threshold amount of the gamma_reference) then the monitoring continues, but if the hold threshold is not satisfied then new Tx, Rx, and duplex DAC values can be determined at 2865, such as according to the 2D grid described with respect to 2840. Tuning 2800 can then be repeated utilizing the new Tx, Rx, and duplex DAC values. Tuning 2800 enables tuning to be performed using weighted Tx, Rx and duplex DACs and a composite weighted gamma opt.

Figure 30:
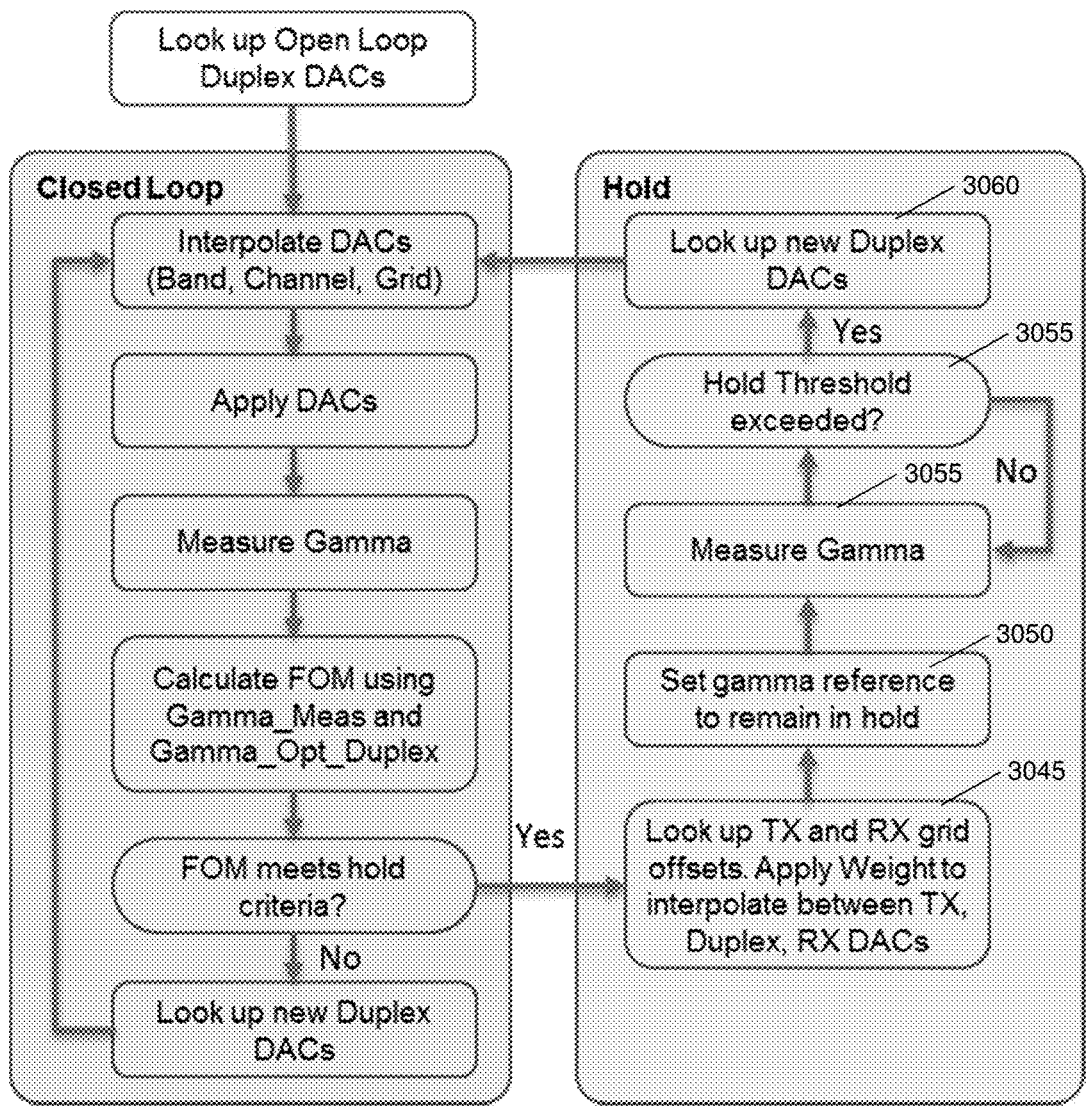
Figure 31:
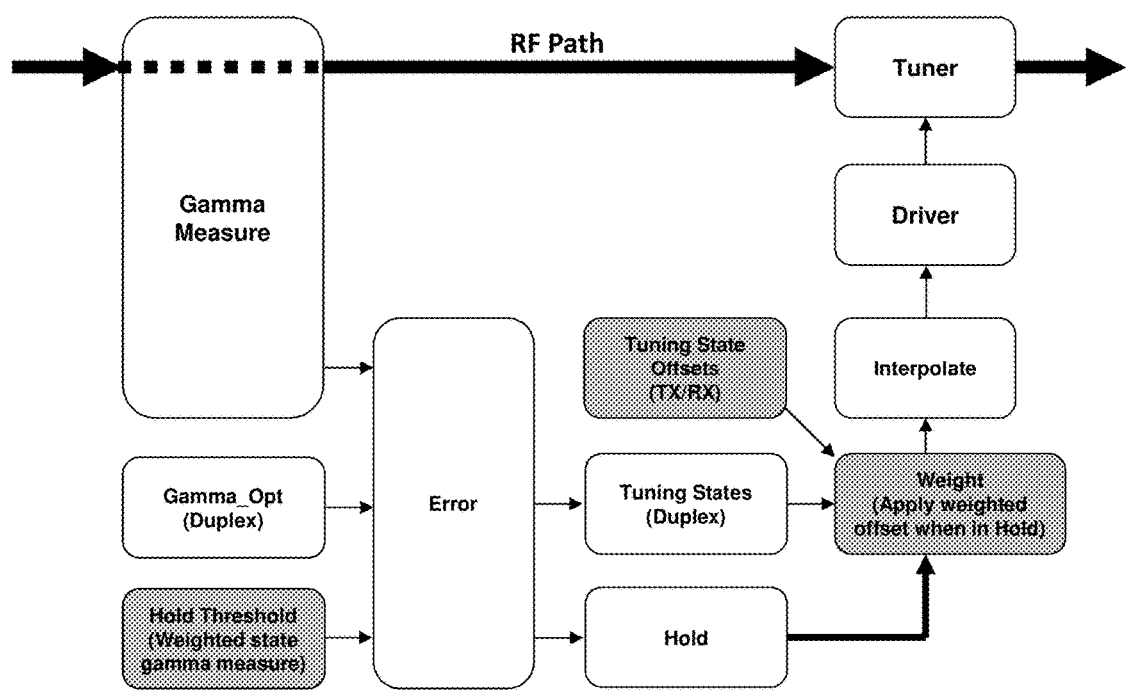

Referring to FIGS. 30-31, an embodiment is illustrated in which system 3100 utilizes a dynamic weighting technique (e.g., for FDD communications) during tuning 3000. Tuning 3000 uses a number of similar steps as in tuning 2400 of FIG. 24. For example, tuning 3000 calculates optimum or desired DACs for duplex operation and fills a table with these duplex DACs. Columns are added to the table that is a grid offset for opt_Tx and for opt_Rx. The algorithm can be implemented to optimize for duplex operation. However, instead of storing Tx and Rx DAC values, system 3100 stores grid offsets where the grid offset is applied to a solution by interpolating between opt_Tx grid offset and opt_Rx grid offset based on the weight factor. As an example at 3045, once optimization has been performed and a hold implemented (e.g., the figure of merit that is calculated according to the measured gamma is determined to satisfy an error threshold associated with the stored gamma_opt-_duplex) then tuning 3000 can look up Tx and Rx grid offsets from the stored table and weighting can be applied to interpolate between the Tx grid offset, the Rx grid offset and the duplex DAC values. A weighting factor can be determined (e.g., according to an operational function) and the weighting factor can be utilized to determine weighted DAC values. In one or more embodiments, weighting criteria can include one or more operational functions such as resource block allocation, modulation type, data throughput, Tx power level, RSSI, RSCP, DTX, battery level, the antenna use case (e.g., closed loop-derived use case determination), and so forth. The operational functions can be measurable criteria that are determined in real-time so that real-time or near-real-time tuning can be performed. Other operational functions can include a determined usage of the communication device, such as a determination that the device will be downloading a file of a certain size, or a determination that a particular application is being executed that typically transmits large files. The weighted DAC values can then be utilized for the tuning configuration of the matching network. For instance, the tunable reactive elements can be adjusted according to the weighted DAC values to adjust the tuning.

At 3050, a criteria can be determined for continuing to tune the communication device utilizing the weighted DAC values (i.e., "hold") or for determining new duplex DAC values for tuning. For example, a gamma_reference (e.g., input reflection coefficient based on RF return loss and reflected phase) can be measured after the tuning based on the weighted DAC values is performed. At 3055 and 3060, monitoring of a measured gamma as compared to the gamma_reference can be performed. For example, the measured gamma can be compared to the gamma_reference according to a hold threshold. If the hold threshold is satisfied (e.g., the measured gamma is within a threshold amount of the gamma_reference) then the monitoring continues, but if the hold threshold is not satisfied then new duplex DAC values can be determined at 3065, such as according to the 2D grid described herein. Tuning 3000 can then be repeated utilizing the new duplex DAC values.

Figure 32:
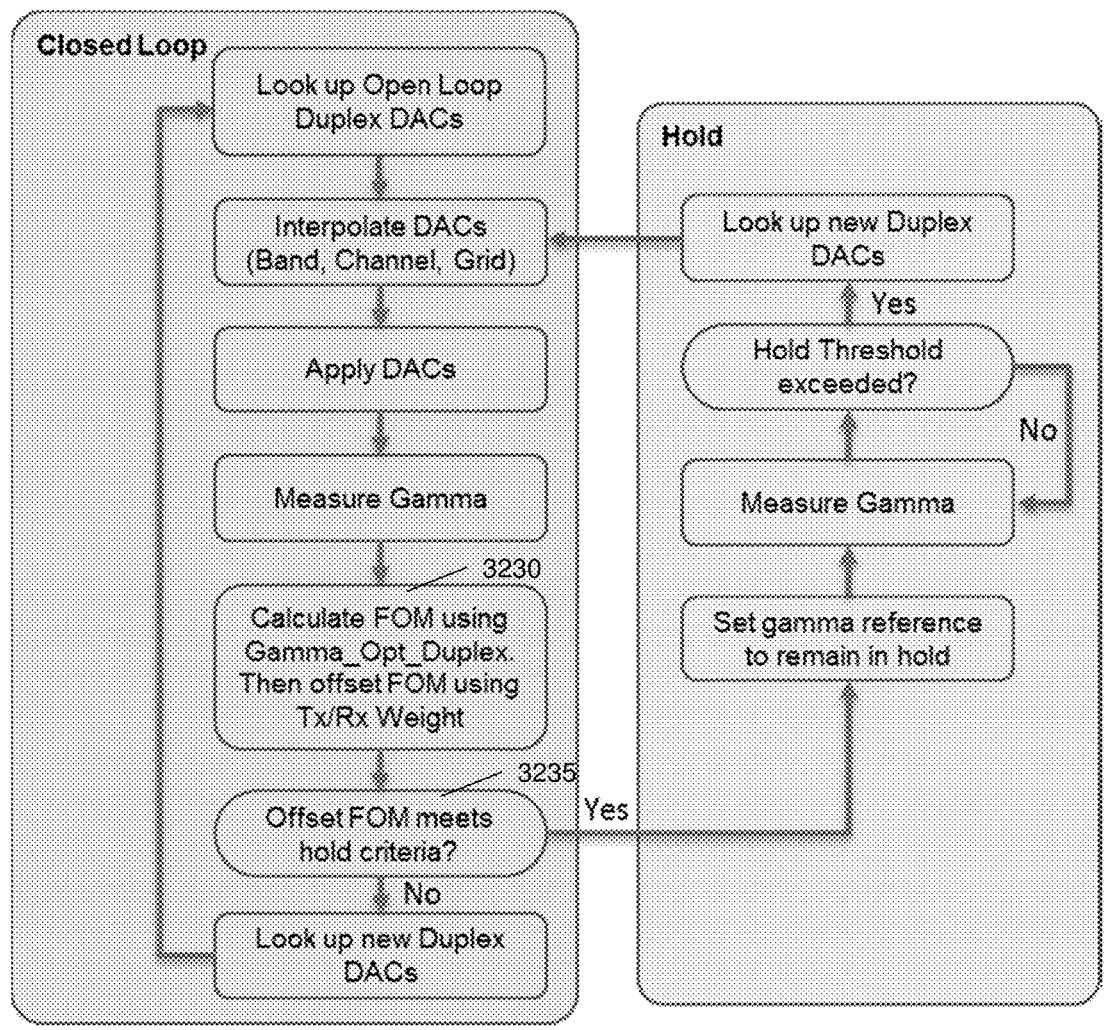
Figure 33:
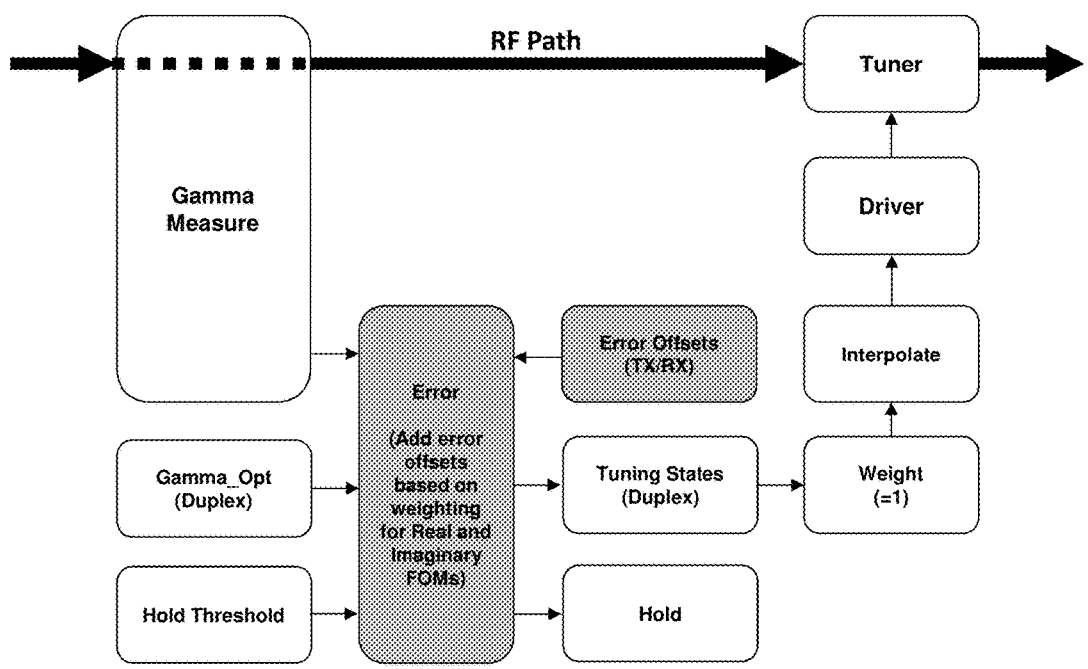

Referring to FIGS. 32-33, an embodiment is illustrated in which system 3300 utilizes a dynamic weighting technique (e.g., for FDD communications) during tuning 3200. Tuning 3200 uses a number of similar steps as in tuning 2400 of FIG. 24. For example, tuning 3200 calculates optimum or desired DACs for duplex operation and fills a table with these duplex DACs, as well as gamma_opt for duplex operation. The table can further contain complex figure of merit offsets (i.e., Real and imaginary) for Tx and Rx. A weighting factor can be applied during the optimization using the stored figure of merit offsets for Tx and Rx. As an example, a figure of merit real and imaginary parts can be calculated as the difference between the measured gamma and the stored gamma_opt. A target figure of merit real part and figure of merit imaginary part can be set to 0 for duplex operation. A target figure of merit real part and figure of merit imaginary part can be set to nonzero for Tx or Rx. In one embodiment when trying to determine a best nonzero target, system 3300 can vary the magnitude and phase of the figure of merit. Once the correct nonzero figure of merit is determined, the real and imaginary parts can be applied in algorithm. The weighting can be adjusted in real-time, such as based on power, band, modulation, and other operational functions described herein.

Similar to tuning 2400, tuning 3200 can utilize the selected (or interpolated) duplex DACs as the tuning configuration; gamma (e.g., input reflection coefficient based on RF return loss and reflected phase) can be measured; and gamma can be compared to an expected performance. For example, a figure of merit can be calculated using the measured gamma and the optimum gamma for duplex operation (gamma_opt_duplex) stored in the table. The figure of merit can be the gamma value or can be based in part on the gamma value, such as taking into account other criteria including maximum phase shifts, maximum tuning steps, and other factors. However, at 3230, the figure of merit is then offset or otherwise adjusted according to the weighting factor resulting in an offset figure of merit. In one or more embodiments, weighting criteria can include one or more operational functions such as resource block allocation, modulation type, data throughput, Tx power level, RSSI, RSCP, DTX, battery level, the antenna use case (e.g., closed loop-derived use case determination), and so forth. The operational functions can be measurable criteria that are determined in real-time so that real-time or near-real-time tuning can be performed. Other operational functions can include a determined usage of the communication device, such as a determination that the device will be downloading a file of a certain size, or a determination that a particular application is being executed that typically transmits large files.

At 3235, the offset figure of merit can be compared to a threshold to determine whether other duplex DAC values are to be utilized or whether the tuning is to continue utilizing the current duplex DACs. In one embodiment, the threshold can be an error threshold associated with the offset figure of merit that is a static threshold. In another embodiment, the error threshold can be dynamic, such as varying based on various factors, such as communication type (voice, video, data or messaging), communication protocol, network requirements, network conditions, and so forth.

If the offset figure of merit is outside of the error threshold or otherwise does not satisfy the threshold then new duplex DAC values can be determined. For example, a 2D grid can be utilized where a next value is selected for the duplex DAC value. If the offset figure of merit is within the error threshold or otherwise satisfies the threshold then a criteria can be determined for continuing to tune the communication device utilizing the duplex DAC values. For example, a gamma_reference (e.g., input reflection coefficient based on RF return loss and reflected phase) can be measured after the tuning based on the duplex DAC values is performed. Monitoring of a measured gamma as compared to the gamma_reference can be performed. For example, the measured gamma can be compared to the gamma_reference according to a hold threshold. If the hold threshold is satisfied (e.g., the measured gamma is within a threshold amount of the gamma_reference) then the monitoring continues, but if the hold threshold is not satisfied then new duplex DAC values can be determined such as according to the 2D grid. Tuning 3200 can then be repeated utilizing the new duplex DAC values. Tuning 3200 enables tuning to be performed using duplex DACs and an offset figure of merit. The offset figure of merit in tuning 3200 enables utilizing different figures of merit according to whether performance is to be biased towards receive operation or biased towards transmit operation.

Figure 34:
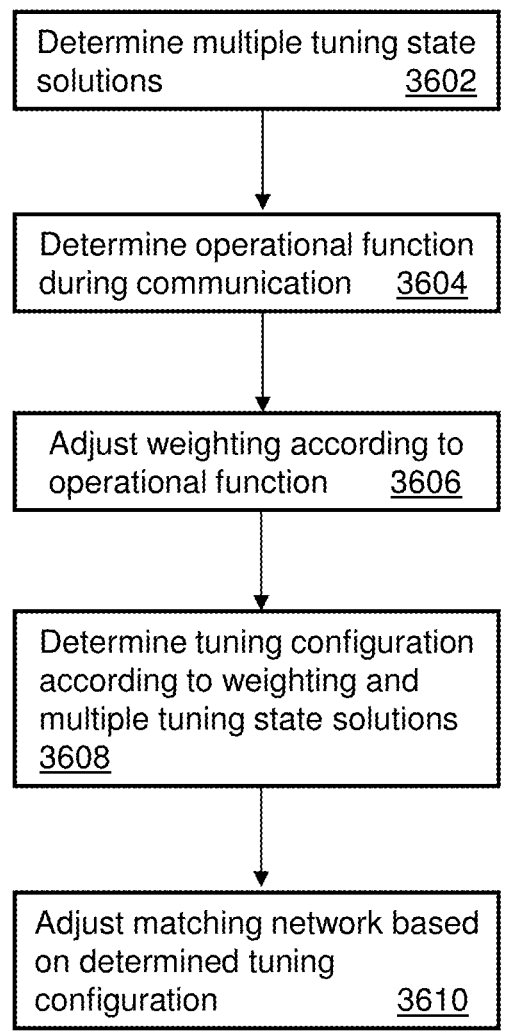
FIGS. 34-36 depict exemplary methods that can be used for dynamic tuning.

FIG. 34 depicts an illustrative method 3600 that can be utilized for dynamic weighted tuning. Method 3600 can begin at 3602 in which multiple tuning states are determined for a matching network. For example during FDD communication, the band/channel of operation can be determined and a look up table stored in the communication device can be searched for predetermined tuning states that have been determined to provide improved or optimal performance for Tx, Rx and/or duplex operation at that band/channel. Other information can also be used for determining the multiple tuning states, such as a usage condition (e.g., hands free operation).

At 3604, an operational function (and/or a change therein) of the communication device can be detected or otherwise determined. In one or more embodiments, the operational functions can be one or more of resource block allocation, modulation type, data throughput, Tx power level, RSSI, RSCP, DTX, battery level, the antenna use case (e.g., closed loop-derived use case determination), and so forth. The operational functions can be measurable criteria that are determined in real-time so that real-time or near-real-time tuning can be performed. Other operational functions can include a determined usage of the communication device, such as a determination that the device will be downloading a file of a certain size, or a determination that a particular application is being executed that typically transmits large files.

At 3606, weighting between the multiple tuning states, such as between first and second tuning states, can be adjusted according to the operational function(s) resulting in an adjusted weighting. For instance, weighting can be determined on a scale of 0 to 1.0. In one embodiment, the weighting can be initiated at 0 and the adjusted to the adjusted weightings according to changes in an operational function(s) detected during the communications. Other weighting techniques can also be applied in order to effect a biasing towards one or more of the multiple tuning states. At 3608. The tuning configuration can be determined for the matching network based on the adjusted weighting. For example, the tuning configuration can be determined by an interpolation that utilizes the first and second tuning states in conjunction with the adjusted weighting.

At 3610, the determined tuning configuration can be applied to the matching network, such as adjusting one or more tunable reactive elements. In one embodiment, the operational function includes a modulation type for the FDD communication. In one embodiments, the operational function includes resource block allocation, data throughput, transmit power level, link margin, received signal metric, discontinuous transmission, battery level, execution of a particular application by the communication device, or any combination thereof. In one embodiment, one of the first or second tuning states includes a tuning state optimized for one of duplex operation, carrier aggregation, or aggregated receive operation.

Figure 35:
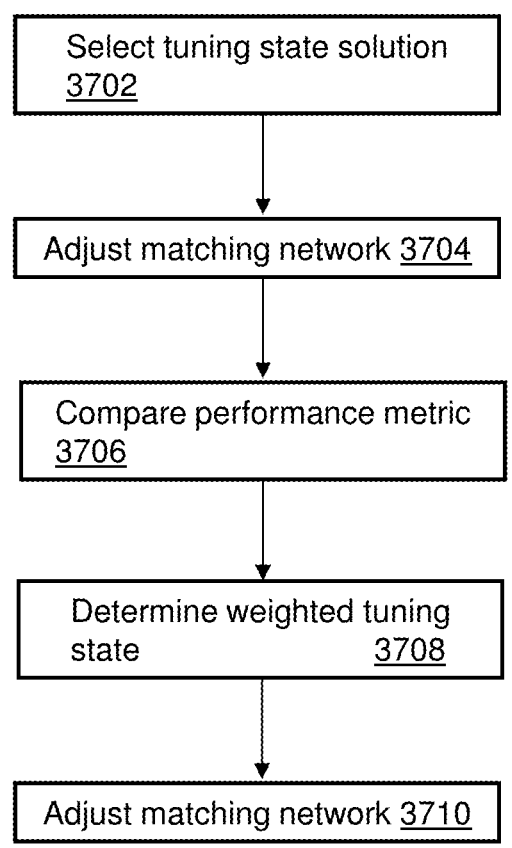

FIG. 35 depicts an illustrative method 3700 that can be utilized for dynamic weighted tuning. Method 3700 can begin at 3702 in which a tuning state is determined. For example, the tuning state can be determined by selecting a first tuning state from a group of tuning states stored in a memory of the communication device. In one embodiment, the stored group of tuning states are predetermined tuning states based on increasing performance in duplex operation. At 3704, the matching network can be adjusted utilizing the first tuning state resulting in a first tuning. At 3706, the first tuning can be evaluated. For example, responsive to the first tuning, a first performance metric can be determined according to a first measurement associated with the communication (e.g., FDD communication). The processor of the communication device can then compare the first performance metric to a first reference metric (e.g., a reference metric that is stored in the memory) resulting in a first comparison.

In one embodiment at 3708, responsive to a first determination that the first performance metric satisfies a first threshold according to the first comparison, a weighted first tuning state can be determined. In one embodiment, the weighted first tuning state can be determined based on a weighting factor, the first tuning state, and a second tuning state selected from another group of tuning states stored in the memory. In one or more embodiments, operational function(s) can be identified for determining the weighting factor. For instance, the operational function can be one or more of resource block allocation, modulation type, data throughput, Tx power level, RSSI, RSCP, DTX, battery level, the antenna use case (e.g., closed loop-derived use case determination), and so forth. The operational functions can be measurable criteria that are determined in real-time so that real-time or near-real-time tuning can be performed. Other operational functions can include a determined usage of the communication device, such as a determination that the device will be downloading a file of a certain size, or a determination that a particular application is being executed that typically transmits large files.

At 3710, the matching network can be adjusted utilizing the weighted first tuning state resulting in a second tuning. In one embodiment responsive to a second determination that the first performance metric does not satisfy the first threshold according to the first comparison, a third tuning state can be selected from the stored group of tuning states. In one embodiment, the processor can: responsive to the second tuning, determine a second performance metric according to a second measurement associated with the FDD communication; compare the second performance metric to a second reference metric resulting in a second comparison; responsive to a third determination that the second performance metric does not satisfy a second threshold according to the second comparison, select the third tuning state from the group of tuning states; and responsive to a fourth determination that the second performance metric satisfies the second threshold according to the second comparison, continue the second tuning. In one embodiment, the second tuning state can be selected from the other group of tuning states according to the first tuning state, where the other group of tuning states is predetermined tuning states based on increasing performance in at least one of transmit or receive operation. In one embodiment, the first performance metric comprises an input reflection coefficient.

In one embodiment, the weighting factor can be determined based on an operational function of the communication device. In one embodiment, the operational function includes downloading an amount of data above a download threshold, and where the weighting factor is biased towards a receive operation. In one embodiment, the operational function includes transmitting an amount of data above an upload threshold, and where the weighting factor is biased towards a transmit operation. In one embodiment, the processor can: monitor a transmit power level; and determine a link margin based on the monitoring, where the operational function includes a determination that the link margin is equal to or below a link margin threshold, and where the weighting factor is biased towards a transmit operation. In one embodiment, the processor can: monitor a receive metric associated with a received signal during the FDD communication; and determine a link margin based on the monitoring, where the operational function comprises a determination that the link margin is equal to or below a link margin threshold, and where the weighting factor is biased towards a receive operation.

In one embodiment, the processor can monitor resource block allocation for the FDD communication, and where the operational function is determined based on the monitoring. In one embodiment, the processor can monitor data throughput for the FDD communication, and where the operational function is determined based on the monitoring. In one embodiment, the processor can monitor battery level during the FDD communication, and where the operational function is determined based on the monitoring. In one embodiment, the operational function of the communication device includes a particular application being executed at the communication device. In one embodiment, the other group of tuning states includes predetermined tuning states based on increasing performance in transmit operation and in receive operation. In one embodiment, the first tuning state includes a tuning voltage, and where the tunable reactive element comprises a voltage tunable capacitor.

Figure 36:
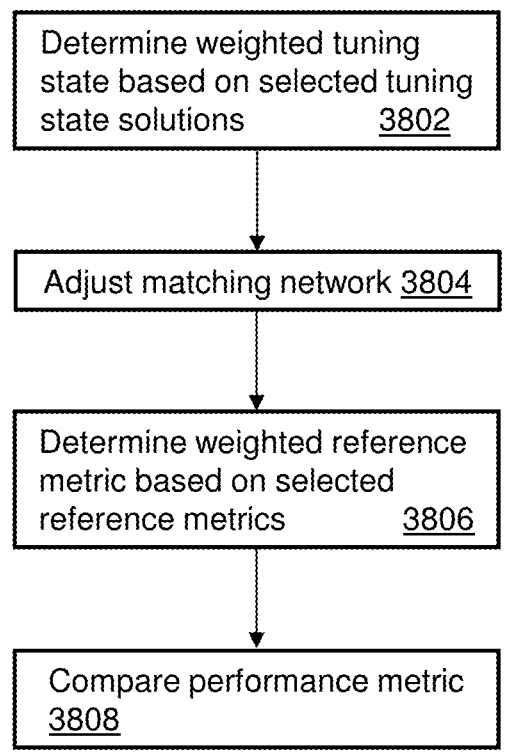

FIG. 36 depicts an illustrative method 3800 that can be utilized for dynamic weighted tuning. Method 3800 can begin at 3802 in which a weighted tuning state is determined according to multiple tuning states. For example, first, second, and third tuning states can be selected from first, second and third groups of tuning states, respectively, where the first, second and third groups of tuning states are stored in a memory of the communication device and are predetermined tuning states based on increasing performance in transmit, receive and duplex operation, respectively. Other multiple tuning states (and/or numbers of tuning states) can be selected based on other targets, such as carrier aggregation. In one embodiment, 3802 can be performed in conjunction with FDD communication. A weighted tuning state can then be determined based on a weighting factor, and the first, second and third tuning states. In one or more embodiments, operational function(s) can be identified for determining the weighting factor. For instance, the operational function can be one or more of resource block allocation, modulation type, data throughput, Tx power level, RSSI, RSCP, DTX, battery level, the antenna use case (e.g., closed loop-derived use case determination), and so forth. The operational functions can be measurable criteria that are determined in real-time so that real-time or near-real-time tuning can be performed. Other operational functions can include a determined usage of the communication device, such as a determination that the device will be downloading a file of a certain size, or a determination that a particular application is being executed that typically transmits large files.

At 3804, the matching network can be adjusted utilizing the weighted tuning state resulting in a tuning. The tuning can then be evaluated according to expected performance. In one embodiment, responsive to the tuning, a first performance metric can be determined according to a first measurement associated with the FDD communication. At 3806, the expected performance can be based on weighting of multiple expected performances resulting in a weighted reference metric. For example, first, second, and third reference metrics can be selected from first, second and third groups of reference metrics stored in the memory of the communication device, where the first, second and third groups of reference metrics are predetermined expected metrics based on increasing performance in transmit, receive and duplex operation, respectively. The weighted reference metric can then be determined based on the weighting factor, and the first, second and third reference metrics.

At 3808, the first performance metric can be compared to the weighted reference metric resulting in a first comparison. In one embodiment, responsive to a first determination that the first performance metric satisfies a first threshold according to the first comparison, the tuning utilizing the weighted tuning state can be continued. In one embodiment, responsive to a second determination that the first performance metric does not satisfy the first threshold according to the first comparison, selecting other tuning states from the first, second and third groups of tuning states, respectively. In one embodiment, responsive to the first determination, the processor can: measure a second reference metric; determine a second performance metric according to a second measurement associated with the FDD communication; compare the second performance metric to the second reference metric resulting in a second comparison; responsive to a second determination that the second performance metric does not satisfy a second threshold according to the second comparison, select fourth, fifth and sixth tuning states from the first, second and third groups of tuning states, respectively; and responsive to a third determination that the second performance metric satisfies the second threshold according to the second comparison, continue the tuning.

In one embodiment, the first, second, and third reference metrics include input reflection coefficients. In one embodiment, the weighting factor can be determined based on an operational function of the communication device. In one embodiment, the operational function of the communication device includes a particular application being executed at the communication device. In one embodiment, the operational function includes downloading an amount of data above a download threshold, and where the weighting factor is biased towards the increasing performance in the receive operation. In one embodiment, the operational function includes transmitting an amount of data above an upload threshold, and where the weighting factor is biased towards the increasing performance in the transmit operation. In one embodiment, the processor can: monitor a transmit power level; and determine a link margin based on the monitoring, where the operational function comprises a determination that the link margin is equal to or below a link margin threshold, and where the weighting factor is biased towards the increasing performance in the transmit operation.

In one embodiment, the processor can: monitor a receive metric associated with a received signal during the FDD communication; and determine a link margin based on the monitoring, where the operational function comprises a determination that the link margin is equal to or below a link margin threshold, and where the weighting factor is biased towards the increasing performance in the receive operation. In one embodiment, the processor can include monitoring resource block allocation for the FDD communication, and where the operational function is determined based on the monitoring. In one embodiment, the processor can monitor data throughput for the FDD communication, and where the operational function is determined based on the monitoring. In one embodiment, the processor can monitor battery level during the FDD communication, and where the operational function is determined based on the monitoring. In one embodiment, the first, second and third tuning states include tuning voltages, and wherein the tunable reactive element comprises a voltage tunable capacitor.

Upon reviewing the aforementioned embodiments, it would be evident to an artisan with ordinary skill in the art that said embodiments can be modified, reduced, or enhanced without departing from the scope of the claims described below. For example, the communication device can be capable of applying multiple dynamic weighting techniques and one or more of those techniques can be selected, such as based on network conditions, type of communication, history of effectiveness of tuning utilizing the particular dynamic weighting technique. For example, the communication device can determine that a communication session is being initiated that requires downloading of a large amount of data in a geographic location where the network is experiencing network latency. The communication device can select a particular dynamic weighting technique from among multiple dynamic weighting techniques, wherein the particular dynamic weighting technique has historically shown effective tuning performance for downloading data where network latency exists. In another embodiment, a detected change in operational function can cause a switch among multiple dynamic weighting techniques, such as switching from tuning 2800 of FIG. 28 to tuning 2400 of FIG. 24 when a low battery detection is made.

Other embodiments can be applied to the subject disclosure without departing from the scope of the claims described below.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 37:
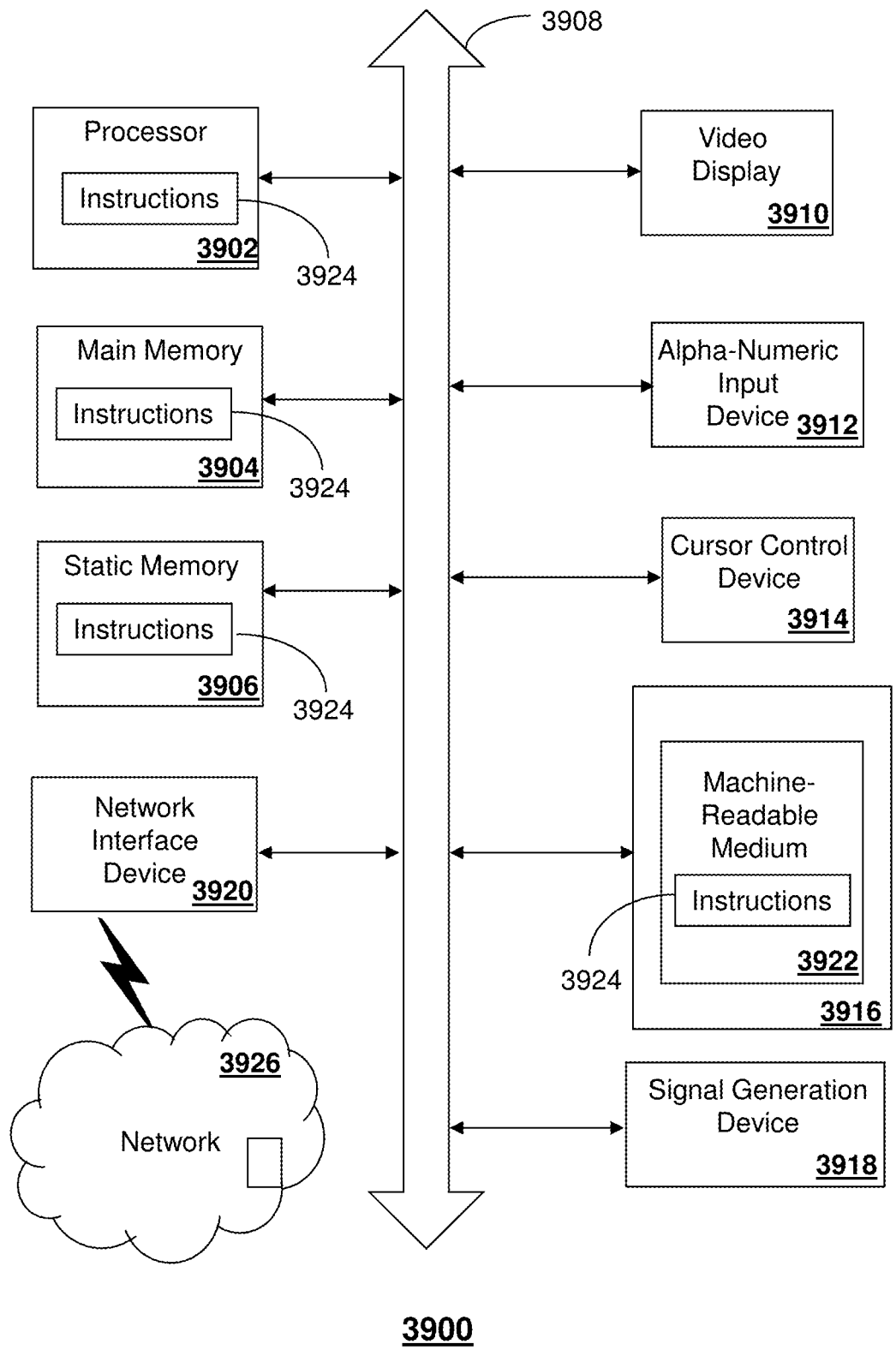
FIG. 37 depicts an illustrative diagrammatic representation of a machine in the form of a computer system within which a set of instructions, when executed, may cause the machine to perform any one or more of the methodologies disclosed herein.

FIG. 37 depicts an exemplary diagrammatic representation of a machine in the form of a computer system 3900 within which a set of instructions, when executed, may cause the machine to perform any one or more of the methods discussed above. One or more instances of the machine can operate, for example, as the communication device 100 of FIG. 1 to provide tuning based on a dynamic weighting factor(s). The weighting factors can be determined during the communications and can change depending on changes to the communications, such as changes to one or more operational functions of the communication device, changes to network conditions, and so forth. In some embodiments, the machine may be connected (e.g., using a network 3926) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 3900 may include a processor (or controller) 3902 (e.g., a central processing unit (CPU), a graphics processing unit (GPU, or both), a main memory 3904 and a static memory 3906, which communicate with each other via a bus 3908. The computer system 3900 may further include a display unit 3910 (e.g., a liquid crystal display (LCD), a flat panel, or a solid state display. The computer system 3900 may include an input device 3912 (e.g., a keyboard), a cursor control device 3914 (e.g., a mouse), a disk drive unit 3916, a signal generation device 3918 (e.g., a speaker or remote control) and a network interface device 3920. In distributed environments, the embodiments described in the subject disclosure can be adapted to utilize multiple display units 3910 controlled by two or more computer systems 3900. In this configuration, presentations described by the subject disclosure may in part be shown in a first of the display units 3910, while the remaining portion is presented in a second of the display units 3910.

The disk drive unit 3916 may include a tangible computer-readable storage medium 3922 on which is stored one or more sets of instructions (e.g., software 3924) embodying any one or more of the methods or functions described herein, including those methods illustrated above. The instructions 3924 may also reside, completely or at least partially, within the main memory 3904, the static memory 3906, and/or within the processor 3902 during execution thereof by the computer system 3900. The main memory 3904 and the processor 3902 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 3922 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) are contemplated for use by computer system 3900.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A communication device, comprising:
   a matching network including a tunable reactive element;
   a processing system including a processor, the processing system being coupled with the matching network; and
   a memory that stores executable instructions that, when executed by the processing system, facilitate performance of operations, comprising:
      during Frequency Division Duplex (FDD) communication, selecting a first tuning state from a group of tuning states stored in the memory, the group of tuning states being predetermined tuning states based on increasing performance in duplex operation;
      adjusting the matching network utilizing the first tuning state resulting in a first tuning;
      responsive to the first tuning, determining a first performance metric according to a first measurement associated with the FDD communication;
      comparing the first performance metric to a first reference metric that is stored in the memory resulting in a first comparison; and
      responsive to a first determination that the first performance metric satisfies a first threshold according to the first comparison, determining a weighted first tuning state and adjusting the matching network utilizing the weighted first tuning state resulting in a second tuning,
      wherein the weighted first tuning state is determined based on a weighting factor, the first tuning state, and a second tuning state selected from another group of tuning states stored in the memory.

2. The communication device of claim 1, wherein the operations further comprise:
   responsive to a second determination that the first performance metric does not satisfy the first threshold according to the first comparison, selecting a third tuning state from the group of tuning states.

3. The communication device of claim 2, wherein the operations further comprise:
   responsive to the second tuning, determining a second performance metric according to a second measurement associated with the FDD communication;
   comparing the second performance metric to a second reference metric resulting in a second comparison;
   responsive to a third determination that the second performance metric does not satisfy a second threshold according to the second comparison, selecting the third tuning state from the group of tuning states; and
   responsive to a fourth determination that the second performance metric satisfies the second threshold according to the second comparison, continuing the second tuning.

4. The communication device of claim 3, wherein the second tuning state is selected from the other group of tuning states according to the first tuning state, the other group of tuning states being predetermined tuning states based on increasing performance in at least one of transmit or receive operation.

5. The communication device of claim 1, wherein the first performance metric comprises an input reflection coefficient.

6. The communication device of claim 1, wherein the weighting factor is determined based on an operational function of the communication device.

7. The communication device of claim 6, wherein the operational function comprises downloading an amount of data above a download threshold, and wherein the weighting factor is biased towards a receive operation.

8. The communication device of claim 6, wherein the operational function comprises transmitting an amount of data above an upload threshold, and wherein the weighting factor is biased towards a transmit operation.

9. The communication device of claim 6, wherein the operations further comprise:
   monitoring a transmit power level; and
   determining a link margin based on the monitoring,
   wherein the operational function comprises a determination that the link margin is equal to or below a link margin threshold, and wherein the weighting factor is biased towards a transmit operation.

10. The communication device of claim 6, wherein the operations further comprise:
    monitoring a receive metric associated with a received signal during the FDD communication; and
    determining a link margin based on the monitoring,
    wherein the operational function comprises a determination that the link margin is equal to or below a link margin threshold, and wherein the weighting factor is biased towards a receive operation.

11. The communication device of claim 6, wherein the operations further comprise monitoring resource block allocation for the FDD communication, and wherein the operational function is determined based on the monitoring.

12. The communication device of claim 6, wherein the operations further comprise monitoring data throughput for the FDD communication, and wherein the operational function is determined based on the monitoring.

13. The communication device of claim 6, wherein the operations further comprise monitoring battery level during the FDD communication, and wherein the operational function is determined based on the monitoring.

14. The communication device of claim 6, wherein the operational function of the communication device comprises a particular application being executed at the communication device.

15. The communication device of claim 1, wherein the other group of tuning states comprises predetermined tuning states based on increasing performance in transmit operation and in receive operation.

16. The communication device of claim 1, wherein the first tuning state comprises a tuning voltage, and wherein the tunable reactive element comprises a voltage tunable capacitor.

17. A method comprising:
adjusting, by a processor of a communication device, a matching network utilizing a first tuning state resulting in a first tuning, wherein the first tuning state is selected from among a first group of predetermined tuning states that increase performance in duplex operation; and
responsive to a comparison of a first performance metric with a first reference metric, determining, by the processor, a weighted first tuning state and adjusting the matching network utilizing the weighted first tuning state resulting in a second tuning, wherein the weighted first tuning state is determined based on a weighting factor, the first tuning state, and a second tuning state selected from a second group of predetermined tuning states.

18. The method of claim 17, wherein the second group of predetermined tuning states increases performance in receive operation, transmit operation, carrier aggregation operation, or a combination thereof, and further comprising:
responsive to a comparison of a second performance metric with a second reference metric, continuing the second tuning,
wherein the second performance metric comprises an input reflection coefficient that is obtained after the second tuning.

19. A non-transitory machine-readable storage medium, comprising executable instructions that, when executed by a processor of a communication device, facilitate performance of operations, comprising:
adjusting a matching network of the communication device utilizing a first tuning state resulting in a first tuning, wherein the first tuning state is selected from among a first group of predetermined tuning states that increase performance in duplex operation; and
responsive to a comparison of a first performance metric with a first reference metric, determining a weighted first tuning state and adjusting the matching network utilizing the weighted first tuning state resulting in a second tuning, wherein the weighted first tuning state is determined based on a weighting factor, the first tuning state, and a second tuning state selected from a second group of predetermined tuning states.

20. The non-transitory machine-readable storage medium of claim 19, wherein the second group of predetermined tuning states increases performance in receive operation, transmit operation, carrier aggregation operation, or a combination thereof, and wherein the operations further comprise:
responsive to a comparison of a second performance metric with a second reference metric, continuing the second tuning,
wherein the second performance metric is obtained after the second tuning, and
wherein the second reference metric is a measured metric.

* * * * *